United States Patent [19]

Chivari

[11] Patent Number: 4,588,388
[45] Date of Patent: May 13, 1986

[54] SHAFT COUPLING

[76] Inventor: Ilie Chivari, Berliner Str. 1, 4690 Herne 2, Fed. Rep. of Germany

[21] Appl. No.: 629,750
[22] PCT Filed: Feb. 25, 1981
[86] PCT No.: PCT/DE81/00037
 § 371 Date: Oct. 21, 1981
 § 102(e) Date: Oct. 21, 1981
[87] PCT Pub. No.: WO81/02452
 PCT Pub. Date: Sep. 3, 1981

Related U.S. Application Data

[63] Continuation of Ser. No. 314,832, Oct. 21, 1981, abandoned.

[30] Foreign Application Priority Data

Feb. 27, 1980 [DE] Fed. Rep. of Germany ....... 3007348

[51] Int. Cl.4 ................................................ F16D 3/62
[52] U.S. Cl. ........................................ 464/69; 464/71; 464/138; 464/904
[58] Field of Search .................... 464/69, 71, 85, 87, 464/138, 147, 904

[56] References Cited

U.S. PATENT DOCUMENTS

| 268,807 | 12/1882 | Landis | 464/69 |
|---|---|---|---|
| 2,181,888 | 12/1939 | Gustin | 464/69 |
| 2,551,837 | 5/1951 | Holloway | 464/69 |
| 4,033,144 | 7/1977 | Allen | 464/69 |
| 4,040,270 | 8/1977 | Chivari | 464/71 X |
| 4,084,411 | 4/1978 | Mayfield | 464/69 |
| 4,187,699 | 2/1980 | Weible | 464/87 X |
| 4,314,460 | 2/1982 | Mayfield | 464/69 |

FOREIGN PATENT DOCUMENTS

| 2520947 | 12/1975 | Fed. Rep. of Germany . |
|---|---|---|
| 856273 | 3/1940 | France . |
| 1427840 | 1/1966 | France . |
| 1486346 | 5/1967 | France . |

Primary Examiner—Stuart S. Levy
Assistant Examiner—Daniel P. Stodola
Attorney, Agent, or Firm—Collard, Roe & Galgano

[57] ABSTRACT

The invention relates to a homokinetic shaft coupling which permits an offset angular disposition and, if need be, a radial and/or an axial offset, between the two parts to be coupled. For this purpose, at least one radially-extending intermediary member is provided between the two coupling halves which is coupled on both diametrically opposite ends with the two coupling halves by guides which generally are disposed in a circumferential direction. The guides are universally mounted on the two coupling halves, as well as on the intermediary member on pins which are disposed in axial direction, axially aligned with one another. If two or more intermediary members are provided, they may be coupled with a universal joint for the purpose of generally effecting a centering with respect to each other.

41 Claims, 26 Drawing Figures

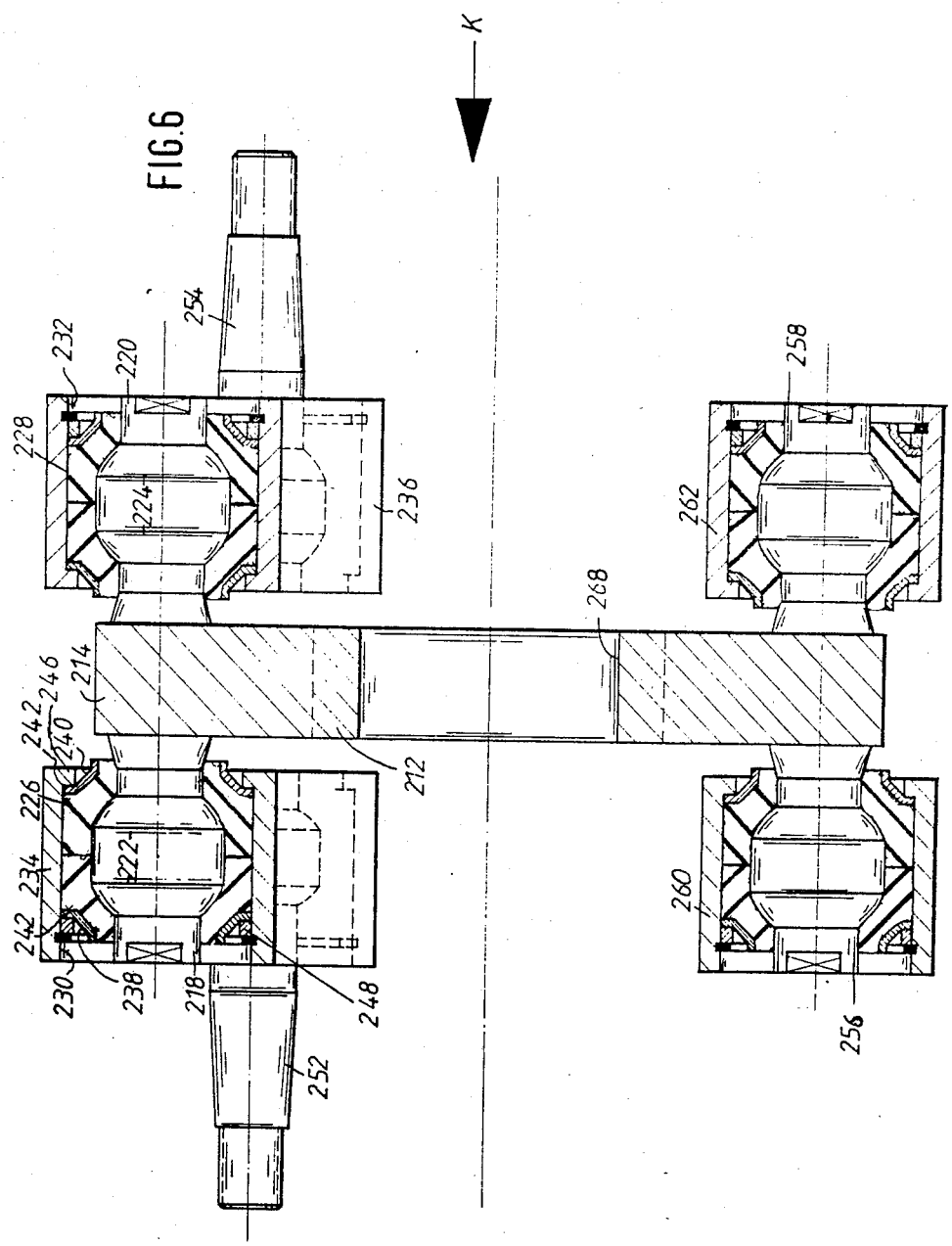

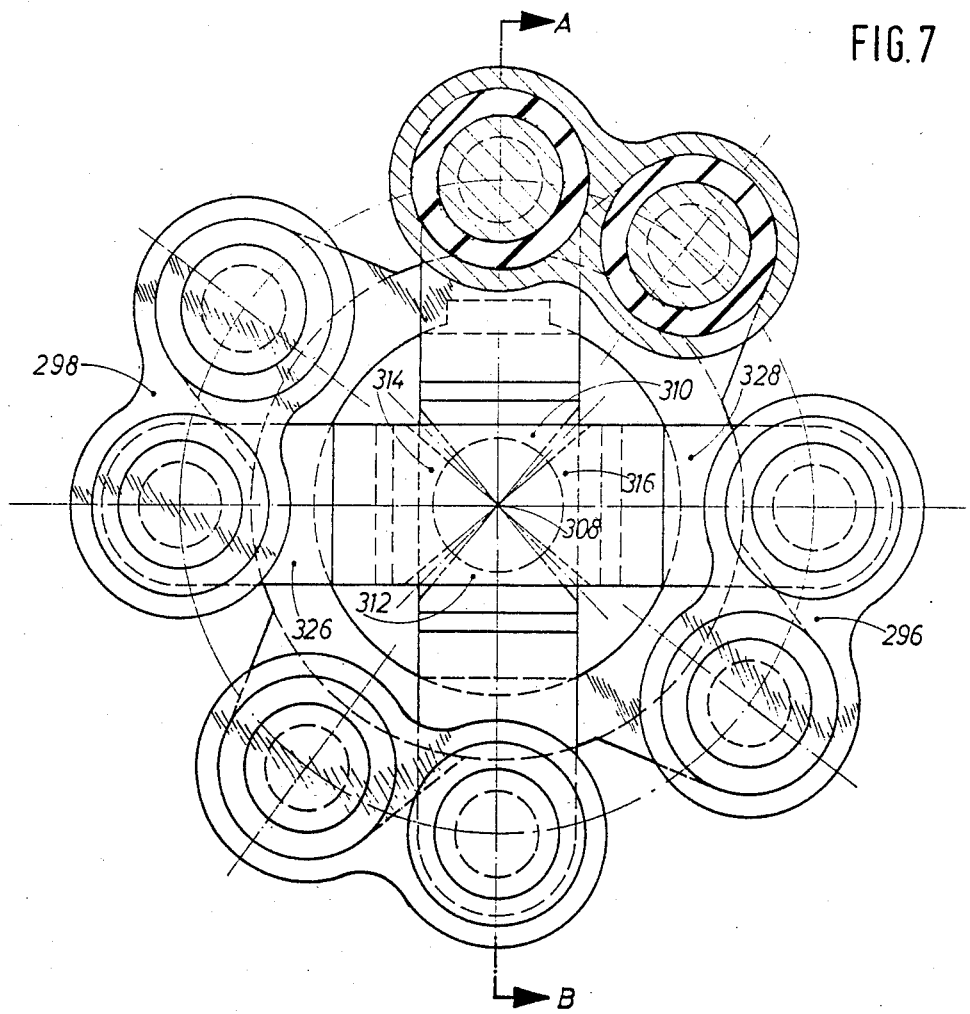

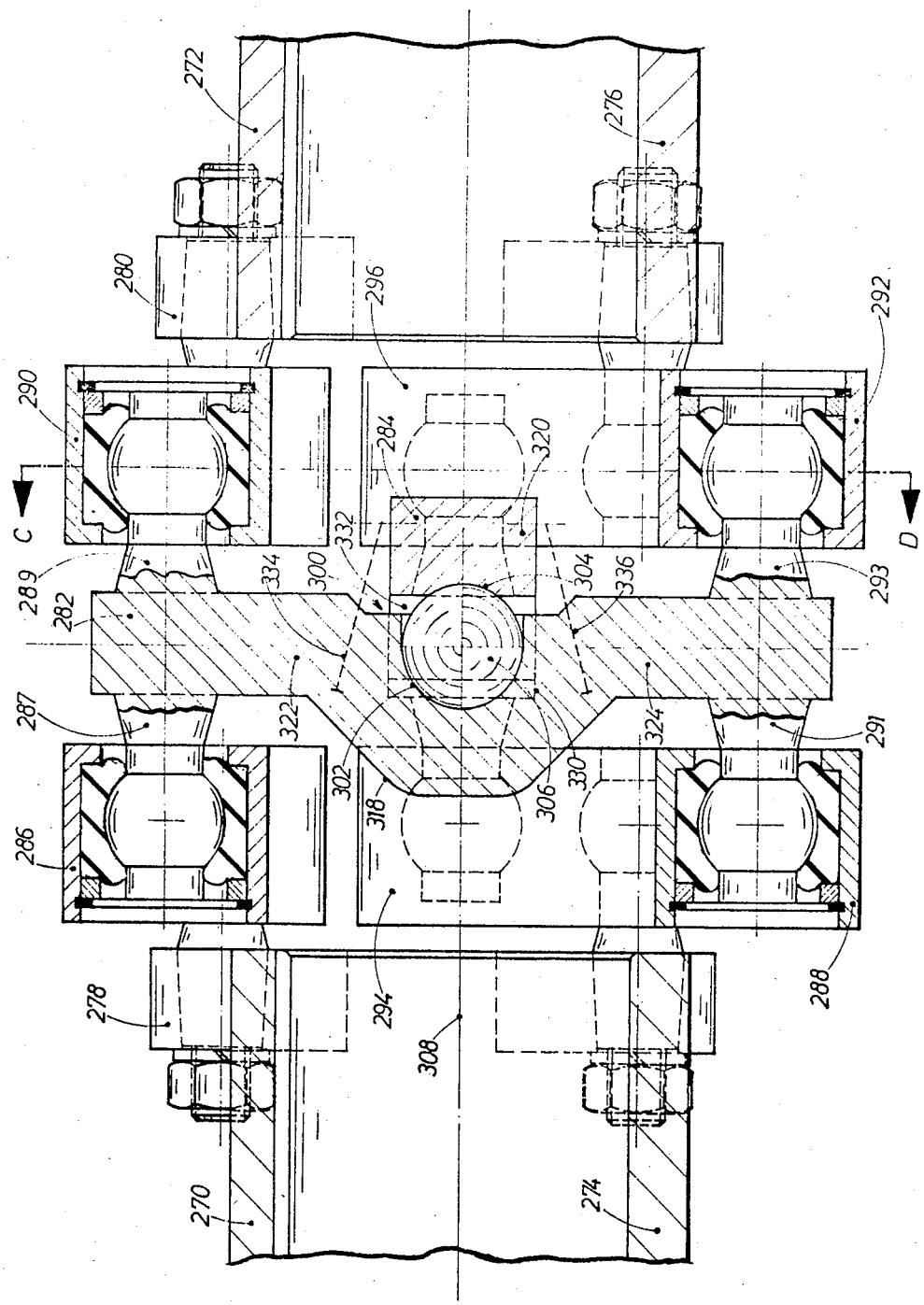

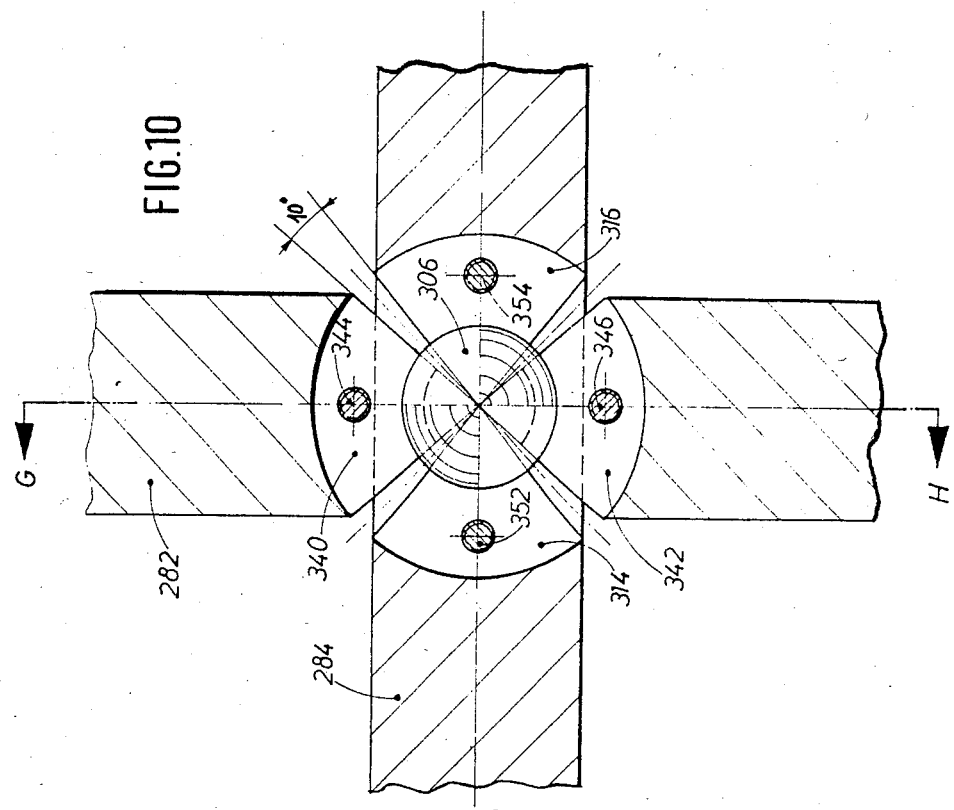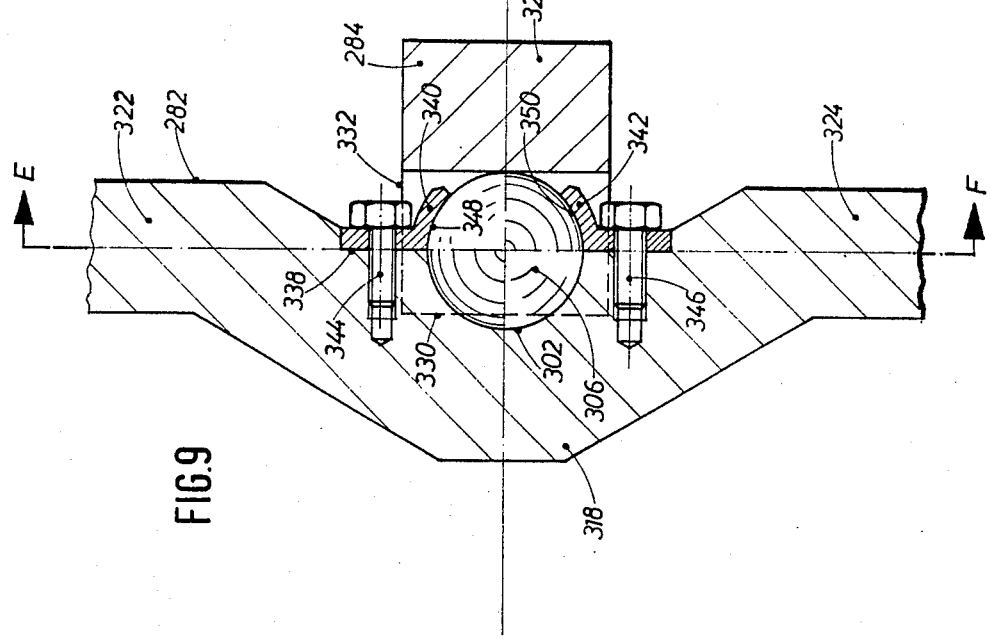

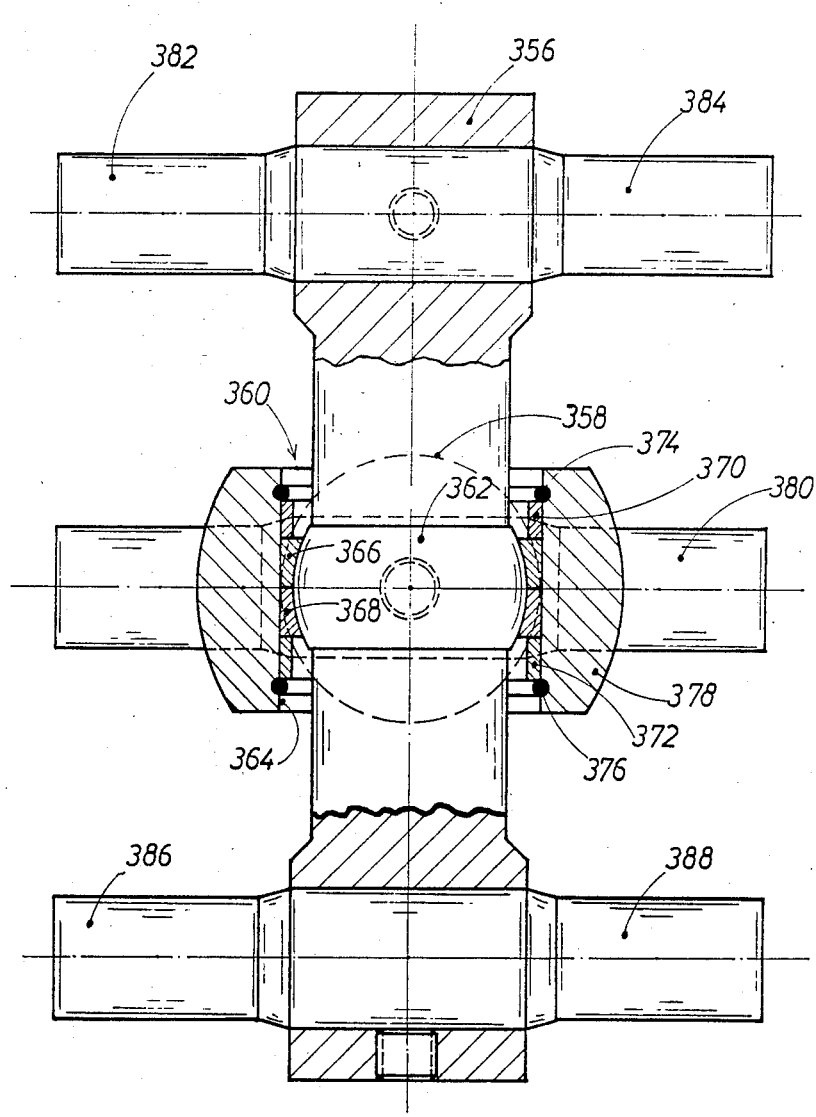

SHAFT COUPLING

This application is a continuation of application Ser. No. 314,832, filed Oct. 21, 1981, now abandoned.

The invention relates to a shaft coupling. More particularly, it relates to a shaft coupling which permits the parts to be coupled to be at an offset angle with respect to one another, comprising a first coupling half, a second coupling half, an intermediary member between the first and second coupling halves, a first guide means with universally pivotable guides which connects the first coupling half with the intermediary member, and a second guide means with universally pivotable guides which connects the second coupling half with the intermediary member.

Such a shaft coupling is known from U.S. Pat. No. 4,040,270 (see FIGS. 12 and 13, for example). In this known shaft coupling, three intermediary members are provided in the form of consecutively superimposed rotatable rings. Each of these rings is coupled by means of a single guide with the first coupling half and is coupled with the second coupling half by means of another guide, which is diametrically opposed to the first guide. The pairs of guides which are associated with the three intermediary members are offset by an angle of about 120° in their rest position, i.e., when the two shafts to be coupled are aligned with one another. The guides are universally pivotably mounted by means of ball joints on the coupling halves or on the intermediary members, respectively. In another embodiment of the coupling, in accordance with the coupling of U.S. Pat. No. 4,040,270 (FIG. 14), the universal pivot movement is carried out by means of rubber elements.

The coupling in accordance with U.S. Pat. No. 4,040,270 permits, in a kinematically sufficient manner, a radial displacement of one shaft relative to the other with an angle-perfect transmission of the rotational movement. The universally pivotable movements of the guide permits the axes of the shafts to be coupled to be at an offset angle with respect to one another. In the known coupling, the torque transmission is carried out by means of a guide of the one coupling half, via the rings and the other guide which is disposed on the other side of the rings, to the other coupling half. Thereby, it is essential that three rings are rotatably mounted in a superimposed manner for the kinematic and torque transmission. This requires a very cumbersome bearing in the practical application of the device.

Another known shaft coupling with an intermediary member which is coupled with a guide means on the drive end and the power output end is disclosed in French Pat. No. 1,457,431. In this known shaft coupling, each guide means consists of three guides which are at a 120° angled displacement position with respect to each other. The coupling half on the drive end is a pot-like element, and the three guides are pivotably mounted on the edge of this pot-like element. The intermediary member is a ring which is mounted within the pot-like element and is connected therewith by the guides. The guides generally are universally pivotably mounted by means of rubber cups or bodies. The ring which forms the intermediary member is also coupled with the disk-like power output coupling half which is disposed within the ring by three 120° angled displaced positioned guides which also generally extend in a circumferential direction. However, this known coupling does not permit a radial displacement. The transmission of a rotational movement at an offset or deflected angle between the drive end and the power output rotational axes is only approximately homokinetic.

It is therefore an object of the invention to provide a constructively simple shaft coupling which permits the rotary axes of the shafts to be coupled at an angle with one another in a kinematically sufficient manner during a homokinematic transmission of the rotational movement.

This object is obtained in that:

(a) the first control guide is provided by a pair of diametrically-opposed guide rods;

(b) the second control guide is provided by a pair of diametrically-opposed guide rods;

(c) one of the guide rods of one pair is disposed in axial alignment with one of the guide rods of the other pair; and (d) the diametrically-opposed guide rods extend from the intermediary member in the same rotary direction substantially in a circumferential direction.

The inventive shaft coupling permits a kinematically sufficient homokinematic transmission of the rotational movement or rotary motion even with an angle offset between the rotating axes of the parts to be coupled. At such an offset angle, the coupling halves move away from each other on one side, while they move closer together on the other side. These deviations can only be compensated in that the guides together with their pivoted ends on their coupled halves move from their radial plane either outwardly or inwardly. Thereby, a shortening occurs in the axial projection of the guides. The "shortening" is accomplished by a pivot movement of the guides and the intermediary member. Therefore, the angle-perfect transmission of the rotating movement is maintained, even at a bend or offset angle.

In contrast to the coupling of U.S. Pat. No. 4,040,270, an immediate coupling between the coupling halves is established in the shaft coupling of the subject invention on both sides of the intermediary member across the axially aligned guides. At each intermediary member, a torque transmission occurs over two parallel operating guides.

No particular arrangements for mounting the superimposed rings have to be made, as is the case in U.S. Pat. No. 4,040,270. The coupling in accordance with the invention permits a homokinetic transmission of the rotational movement even during a radial and axial displacement of the shafts which may occur in addition to their offset angle. During such a displacement, the compensating movement of the intermediary member occurs in the form of a pivot movement of the intermediary member around a vertical transverse axis with respect to its longitudinal direction.

When small torques are transmitted, only one individual intermediary member is provided which is not retained positively but centrically by means of springs. During low torques and high speed torques, the intermediary member can be pulled radially outwardly, due to the centrifugal force. Therefore, in some embodiments of the invention, two oppositely angled-displaced intermediary members are provided which are rotatably coupled with each other by a central axis. In this way a centering of both intermediary members is accomplished. Thereby, the intermediary members cannot be pivoted out of their radial plane. Consequently, such a shaft coupling compensates for an offset angle between the shaft axes, but does not compensate for a radial displacement.

It is therefore a further object of the invention to design the shaft coupling in such a manner that, on the one hand, a centering of each intermediary member is assured and, on the other hand, any offset angle as well as a radial and axial displacement is compensated for.

This object of the invention is obtained in that the intermediary member is secured against a twisting or turning around the rotational axis, as well as an inclination of the intermediary member towards a radial plane, and against a radial displacement by means of a universally pivotable joint.

Therefore, this further embodiment of the invention provides a positive centering of the intermediary member. This centering is carried out by a universally movable joint, so that the intermediary member not only carries out a rotating movement around the rotational axis, but also a pivot movement out of its radial plane, thus being able to execute the required compensation movements for the offset angle, as well as for a radial displacement.

It is still another object of the invention to retain the intermediary members centrally against the forces of gravity or the centrifugal forces when no centering occurs by the transmitted rotating movement.

The wear and tear of the centering means should be kept to a minimum. Wear and tear that does occur should be compensated by self-adjustment of the centering elements. Also, it should be possible to insert a continuous shaft through the shaft coupling as required in train devices, for example.

This object of the invention is obtained in that:

(a) the intermediary member is mounted on a tube or pipe by means of a ball joint;

(b) the tube is coupled at its two ends with the first and the second coupling half, respectively, by means of universal joint couplings; and (c) a continuous shaft is extended centrally through the tube.

Another solution to the latter-named object of the invention is that:

(a) two intermediary members are coupled by means of a guide means with the coupling halves and are disposed opposite each other in an offset angle around the rotating axis and have opposed aligned recesses for a rotatable coupling in their zone of crossing area between which a ball bearing is retained; and (b) the ball bearing is provided with friction reducing means.

An improvement of the guide means may be obtained in that:

(a) the guides are elastically and pivotably mounted by means of rubber cups on the pin of the intermediary member, whereby the rubber cups are provided with a shoulder mounted on the pin of the intermediary member, an eyelet of the guide which surrounds the shoulder but is spaced therefrom, and an elastic rubber mass which fills the intermediary space between the shoulder and the eyelet; and (b) the rubber elastic mass is pretensioned by pressure members disposed on both sides around the pin, whereby the mass is pushed inwardly in the eyelet and secured in the pretensioned position.

Other objects and features of the present invention will become apparent from the following detailed description when taken in connection with the accompanying drawings which disclose several embodiments of the invention. It is to be understood that the drawings are designed for the purpose of illustration only and are not intended as a definition of the limits of the invention.

Some embodiments of the invention are explained in more detail in conjunction with the appended drawings wherein:

FIG. 6 is a longitudinal sectional view taken along line G-H of FIG. 5;

FIG. 7 is a sectional view of another embodiment of the invention, which has two intermediary members and a ball bearing therebetween, which is taken along line C-D of FIG. 8;

FIG. 8 is a longitudinal sectional view taken along line A-B of FIG. 7;

FIG. 9 is a sectional view taken along line G-H in FIG. 10, showing a modified embodiment wherein two intermediary members cross one another with a ball bearing disposed therebetween;

FIG. 10 is a sectional view taken along line E-F of FIG. 9;

FIG. 11 is a side elevational view, in part section, showing the intersection of two intermediary members in a further embodiment;

Figure 1:
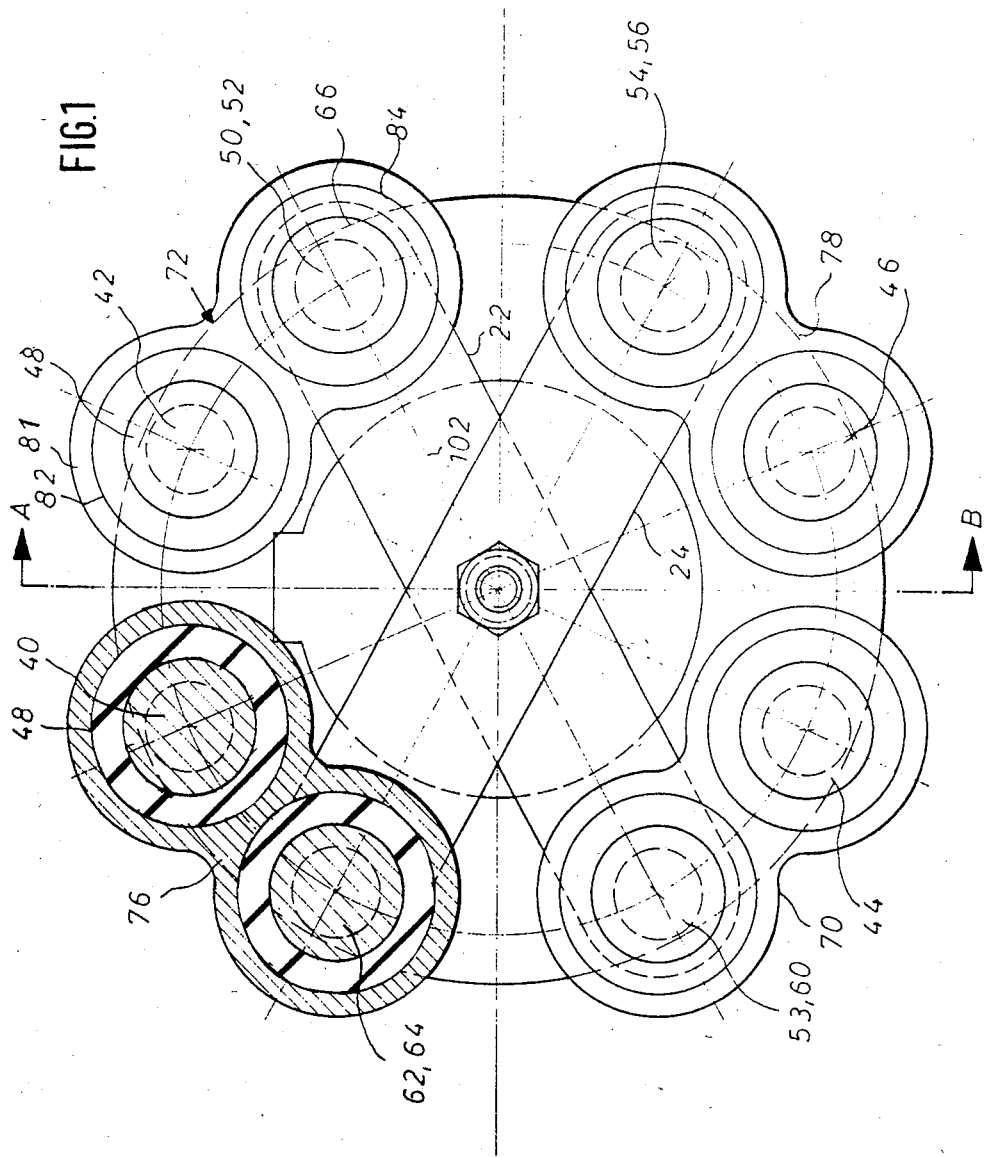
FIG. 1 is a cross-sectional view of a shaft coupling embodying the present invention taken along line C-D of FIG. 2.
Figure 2:
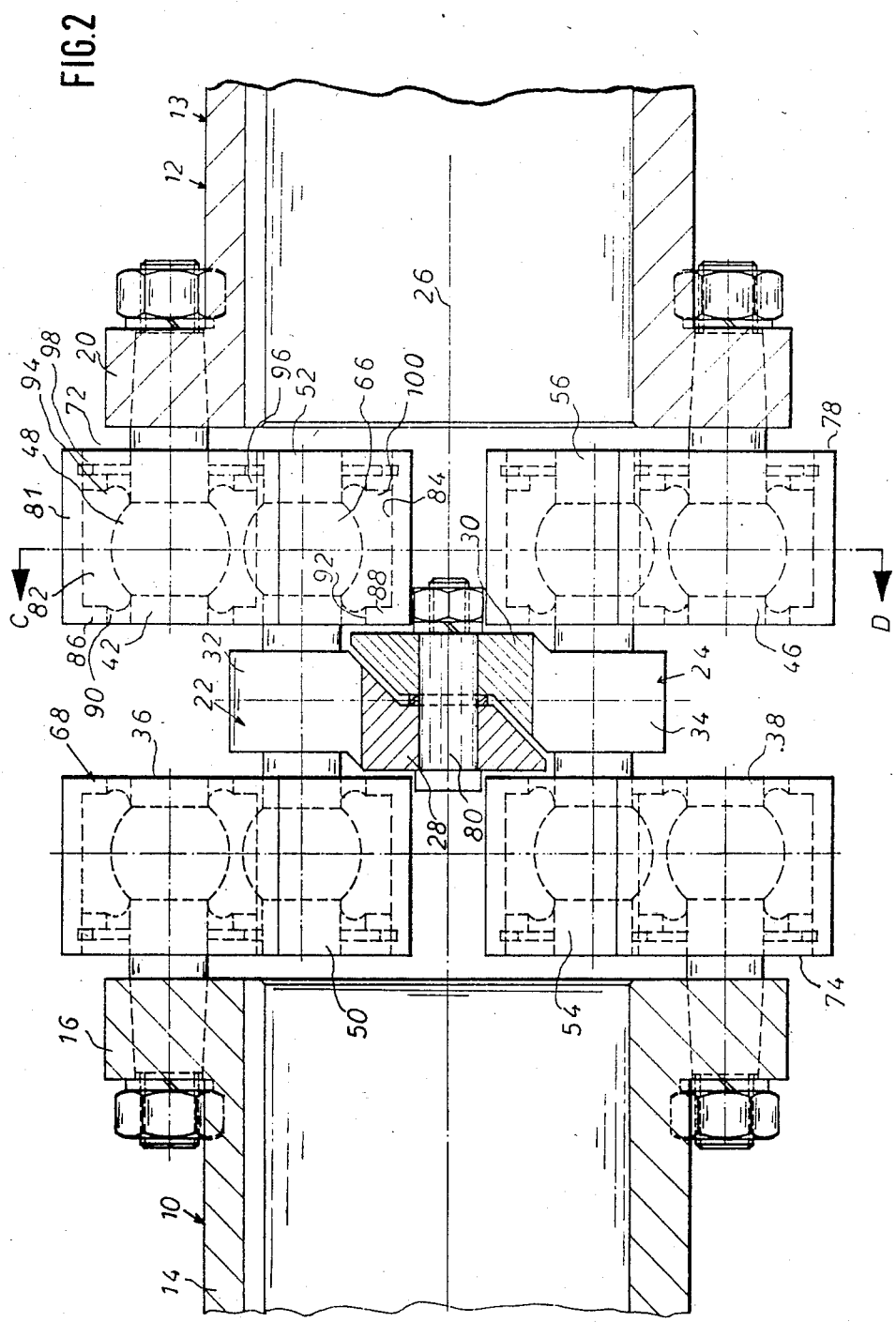
FIG. 2 is a longitudinal sectional view of the shaft coupling taken along line A-B of FIG. 1.

Referring now in detail to the drawings, the coupling shown in FIGS. 1 and 2 comprises a first coupling half 10 and a second half 12. In the shown embodiment, The first coupling half 10 is provided with a hub 14 having a flange 16 and the second coupling half 12 is provided with a hub 13 having a flange 20 facing flange 16. Two intermediary members 22 and 24 are disposed between coupling halves 10 and 12. Intermediary member 22 is a longitudinally-extending or elongated part which extends perpendicularly to the rotating axis 26 (in the rest position when the shafts are aligned with each other) and is provided with an offset or bend 28 at the center thereof. Intermediary member 24 is also a longitudinally-extending or elongated part which extends perpendicularly to rotating axis 26 and crosses intermediary member 22. It is also provided with a bend 30 in the center thereof, disposed opposite to bend 28. Intermediary members 22 and 24 engage with their bends 28 or 30, respectively, in such a manner that their ends 32, 34 lie in a common plane.

Four pins, of which only two pins 36 and 38 are shown in FIG. 2, are mounted on flange 16. Pins 36 and 38 are disposed behind the plane of the paper of FIG. 2, which is reflected by line A-B in FIG. 1. Two further pins are disposed symmetrically to pins 36 and 38 in front of the plane of the paper of FIG. 2. The arrangement is practically the same as shown in FIG. 1 for second coupling half 12. Flange 20 of the second coupling half supports four pins 40, 42, 44, 46 (FIG. 1), of which only the pins 42 and 46 are shown in FIG. 2. The two further pins of first coupling half 10 are aligned with pins 40 and 44. Each of pins 36 and 38 and the two pins which are not visible as well as pins 40, 42, 44, 46 are provided with a ball-shaped shoulder 48.

Pairs of aligned pins are provided on the ends 32 and 34 of intermediary members 22 and 24. For example, a pair of pins 50, 52 on end 32 of intermediary member 22 and a pair of pins 54, 56 on end 34 of intermediary member 24 are shown in FIG. 2. On the opposite ends of intermediary members 22 and 24 pairs of aligned pins 53, 60 and 62, 64, respectively, are mounted in the same manner, with pins 53 and 62 being directed towards first coupling half 10. A spherical shoulder 66 is provided on the ends of pins 50, 52, 54, 56, 53, 60, 62 and 64 which is disposed in the same radial plane as spherical shoulder 48 on the pin of the adjacent coupling half.

Intermediary member 22 is coupled with first coupling half 10 by a guide arrangement of two diametrically-opposed universally pivotable guides—namely, a guide 68 (FIG. 2) and a further guide (not shown in FIG. 2) coupled in an aligned manner with a guide 70 shown in (FIG. 1). The diametrically-opposite guides extend from intermediary member 22 in the same rotational circumferential direction—namely, in a counter-clockwise direction. Furthermore, intermediary member 22 is coupled with second coupling half 12 by means of a second guide arrangement of two diametrically-opposed, universally movable and pivotable mounted guides 70 and 72. Thereby, one guide of the one pair is disposed in an axially-aligned direction with a guide of the other pair, i.e., guide 68 is aligned with guide 72, for example. In a similar manner, second intermediary member 24 is coupled with first coupling half 10 by means of a guide arrangement of two diametrically opposite guides—namely, guide 74 (FIG. 2) and a guide not shown in the drawings in an aligned arrangement with a guide 76 shown in (FIG. 1).

Second intermediary member 24 is coupled with second coupling half 12 by means of a second guide arrangement which consists of diametrically-opposed, universally-movable, pivotably-mounted guides 76 and 78. In this arrangement, the diametrically-opposed guides extend from intermediary member 24 in the same rotational circumferential direction—namely, in a clockwise direction. In this arrangement, one guide of the one pair is axially-aligned with the guide of the other pair, for example, guide 74 with guide 78.

The two intermediary members 22 and 24 are rotatably coupled with each other by a bolt 80 for rotation about a central axis which, in the shown rest position, coincides with the rotational axis 26.

Guides 68, 70, 72, 74, 76, 78, etc., are universally movably coupled by means of rubber cups with coupling halves 10, 12 or the intermediary members 22, 24, respectively. The type of connection is more clearly described in the following in conjunction with guide 72. The remainder of the guides are designed in the same manner.

Guide 72 is provided with a goggle-like housing 81 forming two cylindrical chambers 82 and 84. On one side, housing 81 forms radially-inwardly protruding flange edges 86, 88 which limit chambers 82, 84 which otherwise are continuous chambers with openings 90, 92. Pin 52 of intermediary member 22 extends through opening 92 and into chamber 84, so that spherical shoulder 66 is disposed centrally in chamber 84.

Pin 42 of second coupling half 12 extends into chamber 82 from the other side, so that spherical shoulder 48 of pin 42 is centrally disposed in chamber 82 and is disposed in the same radial plane as shoulder 66 of pin 52. A rubber cup 94 is mounted in the annular space within chamber 82 between the wall of chamber 82 and spherical shoulder 48. The cup is pressed into this annular space and engages edge 86 at one side, while it is retained on the other side by a ring 96 which is secured by a snap ring 98. A rubber cup 100 is provided in a similar manner in chamber 84 in the annular space between the wall of chamber 84 and spherical shoulder 66.

Guide 72 is elastically and universally movably coupled to coupling half 12 and intermediary member 22, respectively, by means of these rubber cups 94, 100 and pins 42, 52, respectively.

The above-described arrangement operates as follows: When driving first coupling half 10, the power transmission occurs, for example, through pin 36, guide 68, pin 50, the aligned pin 52, guide 72 which is in an axially-aligned position with respect to guide 68, and pin 42 onto the right coupling half 12. In a corresponding manner, the power on the opposite end of intermediary member 22 is directly transmitted to the second coupling half 12 by means of pins 58, 60, guide 70 and pin 44. Thereby, a torsion force is applied on intermediary member 22 around a radius 102. In the same manner, a direct power transmission occurs to guides 74, 78, for example, which are coupled with intermediary member 24.

Pin 80 prevents any instability which may occur due to the centrifugal forces on the unstressed shaft coupling when intermediary member 22 or 24 moves out of its center position.

In the case of the axes of coupling halves 10 and 12 being offset relative to the rest position in FIG. 2, flanges 16 and 20, e.g., are somewhat more pulled apart at the upper part of FIG. 2, while they will be closer together in the lower part of FIG. 2; the second half 12 in FIG. 2 being somewhat pivoted in a clockwise direction. This is compensated by a pivot movement of the guides in the plane of the paper of FIG. 2. On the top, guide 68 pivots in a counterclockwise direction and guide 72 pivots in a clockwise direction. On the bottom, guide 74 pivots in a counterclockwise direction and guide 78 pivots in a clockwise direction in the same amount as the upper guides 68, 72. In order to recognize this operation, it should be noted that FIG. 2 is an "instantaneous photograph" and that the pair of guides 68, 72, 74, 78 exchange their function after a 180° rotation. It should be also noted that the guides do not extend radially, as can be seen from FIG. 1.

Due to the pivoting of the guides in the plane of the paper of FIG. 2, an apparent shortening of the guides would occur in an axial direction, i.e., in FIG. 1. This shortening is taken into consideration by a pivot movement of intermediary member 22 or 24 and the guide in FIG. 1. For example, when guide 72 of FIG. 2 is pivoted in a clockwise direction and therefore is shortened in a longitudinal direction, as viewed in FIG. 1, then this apparent shortening is taken into consideration by a pivot movement of intermediary member 22 in a counterclockwise direction in FIG. 1, i.e., pin 52 approaches pin 42 in a circumferential direction. Guide 68 which is pivoted in a counterclockwise direction undergoes the same apparent shortening which is compensated in the same manner by the pivot movement of intermediary member 22, with pin 50 approaching pin 36 in a circumferential direction. Thereby, the angle displacement between pins 36 and 42 remains unchanged.

In the same manner, the compensation occurs on the opposite end of intermediary member 22. Guide 70 is pivoted in a clockwise direction and thereby the axially-aligned pivotably mounted guide on first coupling half 10 is pivoted in a counterclockwise direction by about the same angle as guides 68 and 72. An apparent shortening of the guides occurs. This is compensated in that intermediary member 22 is turned counterclockwise, so that pin 60 of the intermediary member approaches in a circumferential direction pin 42 of the second coupling half 12, for example. The opposite angle position of the pins on the two coupling halves 10, 12 remains unchanged. Therefore, a homokinetic transmission of the rotational movement occurs.

The movement transmission is carried out in the same manner by the guides which re pivotably mounted on the second intermediary member. The guides, for example, 70 and 72, are so pivotably mounted on intermediary member 22 that they both extend from this intermediary member in a counterclockwise circumferential direction. All guides, for example, 76 and 78, are pivotably mounted on intermediary guide 24, so that they extend from this intermediary member in a clockwise circumferential direction as shown in FIG. 1.

In a similar manner, the coupling also permits a radial displacement of the shafts during the homokinetic transmission of the rotational movement. For example, if coupling half 10 is stationary and coupling half 12 is moved downwardly (in FIG. 2) while maintaining its parallel disposition, during such a movement, pin 42 of guide 72 is moved downwardly, for example, while pin 36 of guide 68 remains in its same position. Pin 50 and 52 remain in an aligned position and the distances of pins 36, 50 or 42, 52, respectively, remain constant, due to guides 68 and 72. A compensation movement occurs in the form of a pivot movement of the guides around the pins and also in the form of a pivot movement of intermediary member 2 around a transverse axis with respect to its longitudinal direction, in the plane of the paper of FIG. 1. The downward movement of pin 42 toward pin 52 is compensated in that guide 72 is pivoted around pin 52 in a clockwise direction in FIG. 1 and that intermediary member 22 and guide 72, as well as guide 68 carry out a compensating movement from their planes, for example, the plane of the paper of FIG. 1. Thereby, pins 36 and 42 remain in the plane of the paper of FIG. 2.

The reaction of the coupling during a radial displacement in a horizontal direction in FIG. 2 is similar. Therefore, the coupling permits an angle-perfect or homokinetic transmission of the rotational movement even at a radial displacement.

Figure 3:
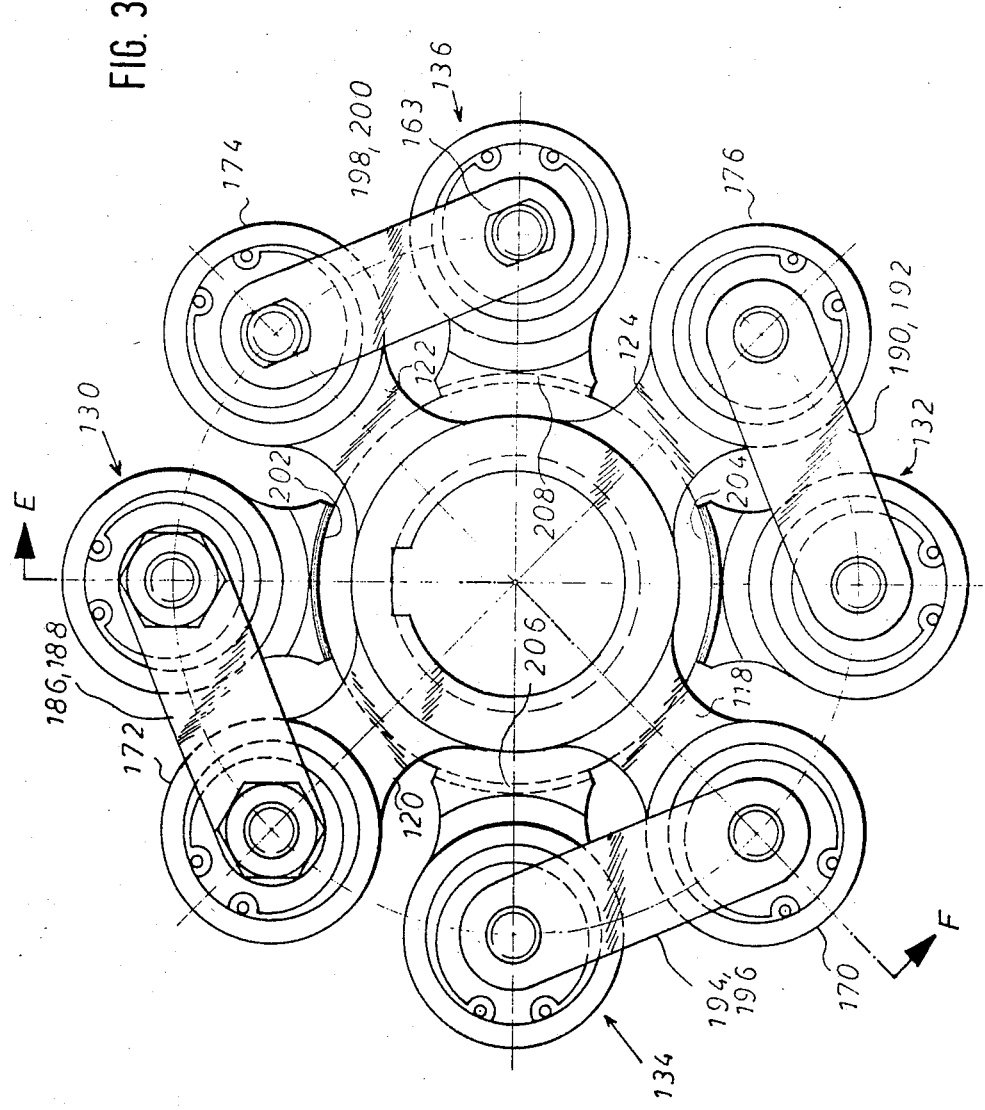
FIG. 3 is an end view of a different embodiment of the shaft coupling, suitable for high speed rotation, as seen in the direction of arrow S in FIG. 4.
Figure 4:
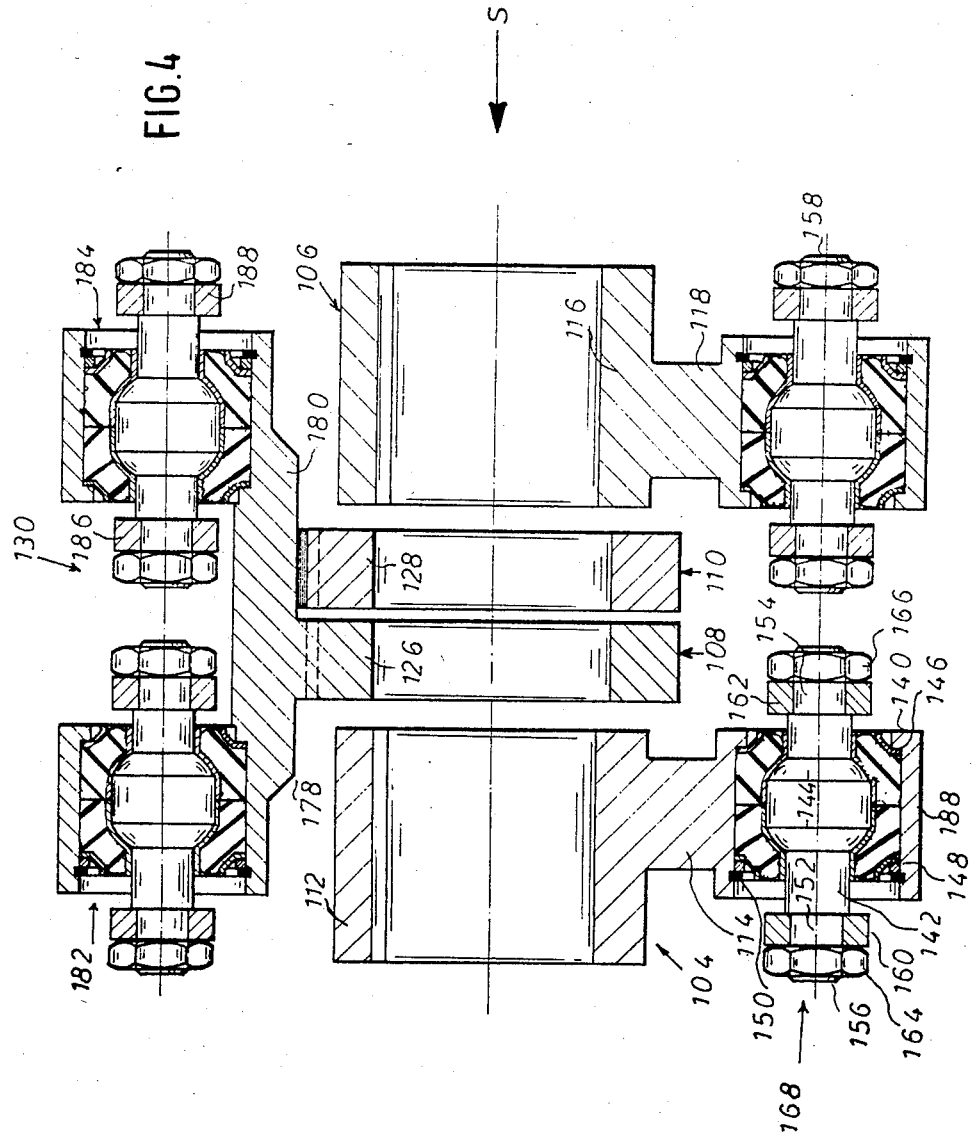
FIG. 4 is a longitudinal sectional view of the shaft coupling taken along line E-F of FIG. 3.

In the embodiment of FIGS. 3 and 4 a first coupling half 104 and a second coupling half 106 are shown. A first intermediary member 108 and a secondary intermediary member 110 are positioned therebetween. First coupling half 104 comprises a hub 112 with four radial arms which are displaced at an angle of 90° with respect to each other, whereby only arm 114 is shown in the sectional view of FIG. 4. Second coupling half 106 comprises a hub 116 with four radial arms 118, 120, 122 and 124 which ae shown in FIG. 3, whereby only arm 118 is shown in the sectional view of FIG. 4.

Intermediary members 108 and 110 comprise rings 126, 128. Ring 126 is provided with a support shoulder 130 on one side and a similar support shoulder 132 on the diametrically-opposed other side, in the section E-F of FIG. 3 only support shoulder 130 is shown. Ring 128 compriss a support shoulder 134 on one side and a similar support shoulder 136 on the diametrically opposed other side. Support shoulders 134 and 136 which are not shown in the sectional view of FIG. 4 are constructed in the same manner as the support shoulder 130 which will be described hereinafter.

Arm 114 ends in a cylindrical housing 138 which is open at both ends. On one side, housing 138 forms an inwardly protruding edge 140. An axis or a pin 142 with a shoulder 144 in the center thereof is centrally mounted in housing 138. The rubber cup 146 is mounted to the annular space until it comes into engagement with edge 140. The rubber cup 146 is pressed into the annular space until it comes into engagement with edge 140. On the opposite side, rubber cup 146 is retained by a ring 148 which is inserted into housing 138 and secured by a snap ring 150. In this manner, pin 142 is elastically and universally movably mounted in housing 138.

The ends of pin 142 extend out of both sides of housing 138. Each of the ends is provided with a flattened segment 152, 154 with oppositely-disposed plane surfaces and a thread segment 156, 158. A plate-like guide 160, 162 is mounted by means of an aperture on each flattened segment 152 and 154, with each guide being retained between the flattened shoulder and a nut 164, 166 which is screwed onto thread segment 156, 158. The apertures have straight edges on which the plane faces engage, so that the guide is non-rotatably coupled with pin 142. Each of the arms 114 and 118, 120, 122 and 124 of coupling halves 104, 106, respectively, supports such a constructed bearing which is designated with the general reference numeral 168 in FIG. 4. FIG. 4 shows bearing 168 of coupling half 104. Three more bearings are provided on the remainder of the arms which are not shown in the drawings. FIG. 3 shows the bearings 170, 172, 174 and 176 which are mounted on arms 118, 120, 122 and 124, respectively. The arms and bearings of the first coupling half 104 are aligned behind arms 118, 120, 122, 124 and the bearings 170, 172, 174, 176 in the axial direction of arrow S.

The bearing shoulders 130 and 132 of first intermediary member 108, of which only the support shoulder 130 is described in detail, is provided with arms 178, 180 which extend in an axial direction on both sides of ring 126. On their ends, axial arms 178, 180 each support one bearing 182, 184 of the same type as bearing 168. Thereby, the lengths of arms 178, 180 are so chosen that bearings 182, 184 of support shoulders 130, 132 and 134, 136 of intermediary members 108, 110 are disposed in the same plane and in the same circle segments as bearings 168 and 170, 172, 174, 176 of the first and second coupling halves 104, 106.

As can be best seen from FIG. 3, a pin 142 of one bearing, for example, 168 of first coupling half 104 is coupled by a pair of plate-like guides 160, 162 with the left bearing of FIG. 4 of the adjacent support shoulder of an intermediary member, for example, intermediary member 110. Thereby, the guides are non-rotatably connected on the pins of this bearing arrangement as described.

In the same manner, the right bearing arrangements of FIG. 4, for example, bearing 184, of support shoulders 130, 132, 134, 136 of the intermediary members 108, 110 are connected by pairs of plate-like guides 186, 188, or 190, 192 or 194, 196 or 198, 200 with the adjacent bearing arrangements 172, 176, 170, 174, respectively.

Intermediary members 108, 110 are rotatably mounted in the area of support shoulders 130, 132 or 134, 136, respectively, by means of curved sliding faces 202, 204 or 206, 208, respectively, on ring 128 or 126 of the intermediary members 110 or 108, respectively. The operation of the described arrangement is principally the same as described in accordance with the embodiment of FIGS. 1 and 2. However, the embodiment according to FIGS. 3 and 4 is particularly suitable for shaft couplings which have to operate with high speed torque.

In the embodiment in accordance with FIGS. 1 and 2, the guides form the housing for the bearings. This housing is mounted on pins which protrude to one side from the coupling half or the intermediary member. Therefore, the guides have a relatively heavy mass, so that high centrifugal forces are effective with high speed torques. These high centrifugal forces affect the pins on one side.

In the embodiments according to FIGS. 3 and 4, these conditions are relatively more favorable. The housings for the bearings are mounted rigidly on the coupling halves or the intermediary members. The guides are relatively light plates. These plates are symmetrically mounted at both sides of the bearings. The mass, and therefore the centrifugal forces are separated into two halves which act on the end of the pin which extends from each bearing. Therefore, only half of the forces act on a shorter arm. Therefore, the embodiment in accordance with FIGS. 3 and 4 may be used for torques, which would be problematic with other couplings due to the centrifugal forces. If the coupling in accordance with FIGS. 3 and 4 should permit a radial displacement of the shafts, the sliding faces 202 and 204 must be removed.

Figure 5:
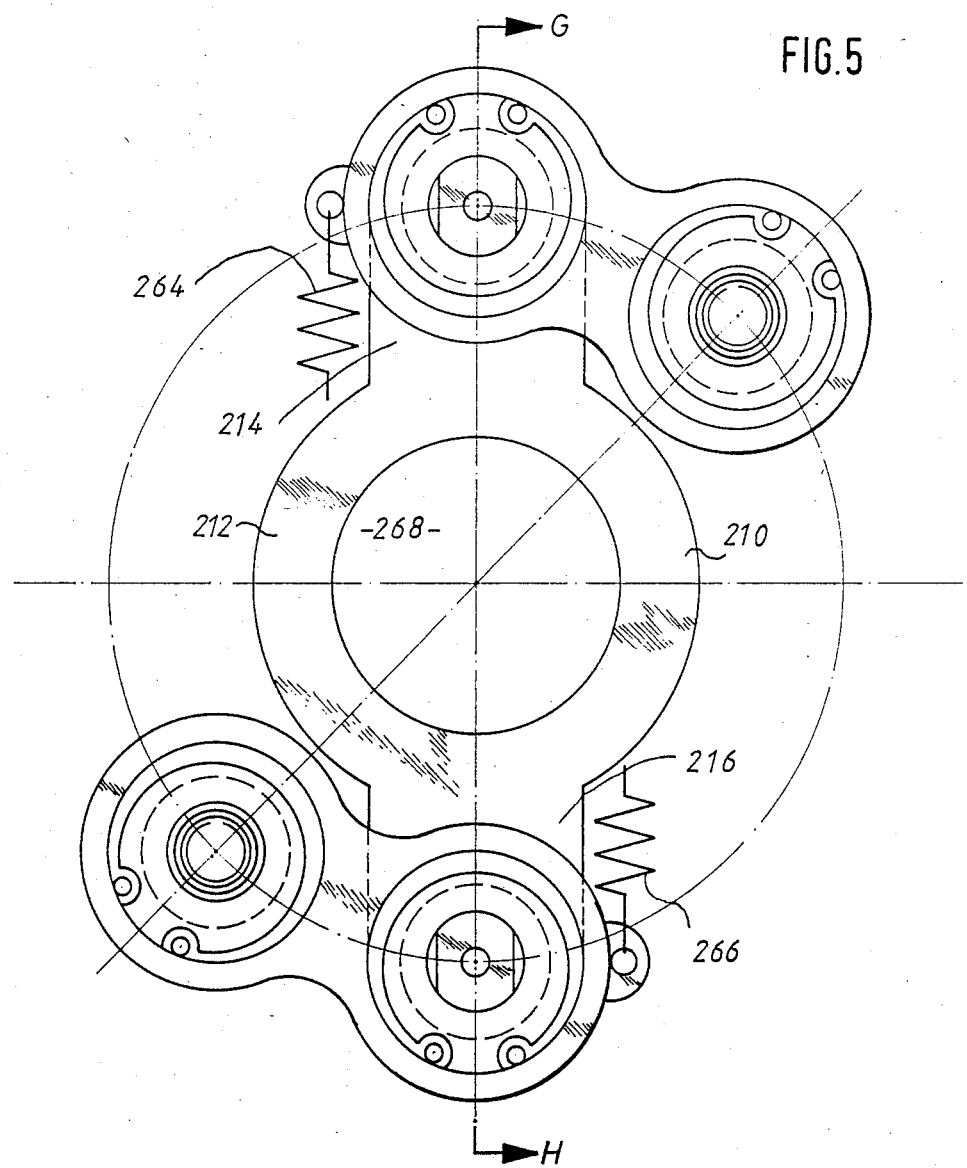
FIG. 5 is an end view of a simplified shaft coupling, as seen in the direction of arrow K in FIG. 6.

FIGS. 5 and 6 illustrate a simplified embodiment of the shaft coupling. In this simplified embodiment only one intermediary member 210 is provided instead of two intermediary members with associated guide arrangements. Intermediary member 210 forms a ring 212 with diametrically-opposed and radially-outwardly extending arms 214 and 216. Arm 214 supports a pair of aligned axial pins 218, 220 on opposite sides thereof which have shoulders 222 and 224, respectively. Shoulders 222, 224 are each surrounded by a rubber cup 226, 228 which is mounted in a cylindrical recess 230, 232 of each guide 234, 236. Rubber cups 226 and 228 are made of two parts and are mounted around the shoulders 222, 224. The ends of the rubber cups, for example, rubber cup 226, are covered with substantially conical sheet metal parts 238, 240 having deflected or bent edges 242 and 244, with edge 242 forming a radial flange and edge 244 forming an axial collar. Sheet metal part 240 engages with its edge 242 on a radially inwardly protruding edge 246 of guide 234. Edge 242 of sheet metal part 238 is retained by a ring 248 which is inserted into recess 230 and is secured by a snap ring 250.

In the same manner, the guides 234 and 236 are pivotably mounted on pins 252, 254 of the first and second coupling halves (not shown).

Pins 256 and 258 are mounted on the diametrically opposite sides of arm 216 on which guides 260, 262 are elastically and pivotably mounted in the same manner as described above. These guides 260, 262 are pivotably mounted in a similar manner to the guid4es 234, 236 on the first and second coupling half (not shown). It is essential to retain the intermediary member in a centered position, so as to prevent an outward movement under the influence of a centrifugal force during idle running. When operating under load, a centering occurs due to the transmitted torque.

The centering may be accomplished by a stationary bearing disposed between the coupling halves when only one angle offset occurs between the shaft axes when no radial displacement occurs. If a radial displacement also occurs, intermediary member 210 may be elastically mounted in its center position, such as by springs 264 and 266, shown in FIG. 5.

Intermediary member 210 has been so designed with its ring 212 and the central bore 268 that a shaft may be inserted therethrough. Furthermore, in the embodiment of FIGS. 1 and 2, the intermediary members may be shaped as adjacent or superimposed rings which permit an insertion of a shaft or axis therethrough.

FIGS. 7 and 8 show a first coupling half 270 and a second coupling half 272. Two crossing intermediary members 282, 284 are disposed between the coupling halves which comprise a hub 274, 276, and four radial shoulders 278, 280. First coupling half 270 is coupled by means of a first guide arrangement with a pair of diametrically oppositely-arranged guides 286, 288 and by means of cup pins 287, 291 with intermediary member 282. The second coupling half 272 is coupled by means of a second guide arrangement with a pair of diametrically-disposed guides 290, 292 and with intermediary member 282. One guide of each pair of guides, for example, guide 286, is in an axially-aligned position with a guide 290 of the other pair of the guides. Correspondingly, guide 288 is in axially-aligned position with guide 292. The diametrically-opposed guides 286, 290 and 288, 292 extend from the intermediary member in the same rotational circumferential direction.

In a corresponding manner, intermediary member 284 is coupled with first coupling half 272. A guide 294 on the right end of the intermediary member 284 shown in FIG. 7 couples this member with the first coupling half and a guide 296 which is in an aligned position therewith couples the intermediary member with the second coupling half 272. A further pair of aligned guides are mounted between intermediary member 284 and the first and second coupling half 270, 272 shown at the left side of FIG. 7, which is not visible in FIG. 8 and of which one guide 298 is shown in FIG. 8. Guides 294, 296 and 298 also extend from the intermediary member in the same rotational circumferential direction.

In contrast to the embodiment in accordance with FIGS. 1 and 2, wherein the guides extend from one intermediary member 22 in a counterclockwise circumferential direction and from the intermediary member 24 in a clockwise circumferential direction, the guides of the subject embodiment extend from all intermediary members in the same direction—namely, clockwise, as shown in FIG. 7.

While in FIGS. 1 and 2, two intermediary members 22 and 24 are mounted by means of a bolt 80 around a central axis which corresponds to the rotary axis in the rest position and is rotatably coupled therewith, intermediary members 282, 284 of the subject embodiment are coupled with each other by a universal joint 300.

Intermediary members 282, 284 are provided with recesss 302, 304 for effecting a rotatably movable coupling in their crossing zone, whereby these recesses face each other in an aligned manner. A ball bearing 306 is retained between grooves 302 and 304. As can be best seen in FIG. 7, each of the crossing intermediary members 282 and 284 are provided with a pair of projections 310, 312 or 314, 316 which are displaced by about 180° with respect to each other and are centered in segments with respect to the rotary axis 308, whereby these projections extend by an angle of less than 90°, for example, 80°. In each of such a pair of shoulders 310, 312 or 314, 316 a centered spherical recess 302, 304 with respect to the rotary axis 308 is provided, so spherical mounting faces of sector-like basic shape are provided on these shoulders.

The projections 310, 312 one intermediary member 282 engage between the projections 314, 316, whereby the ball bearing 306 is retained between pairs of mounting faces. Since the projections extend by an angle of 80° a free angle area of 10° is provided between the meshing projections which permits a turning of the intermediary members around the rotational axis 308. Intermediary members 282 and 284 are retained with their opposing surfaces at a distance from each other by the ball bearing 306, so that a pivot movement is made possible by the intermediary members 282 and 284 around the ball bearing and with respect to each other, and also from the radial plane, as is required for the compensation of a radial displacement. In the radial direction, the intermediary members are centered with respect to each other, so that none of the intermediary members can be pulled radially outwardly by the centrifugal forces.

The intermediary members are formed by longitudinally-extending or elongated radial elements with a central offset or deflection 318, 320 and radial arms 322, 324 or 326, 328 supporting the guides extending on both sides of the longitudinally-extending elements. The crossing intermediary members 282, 284 mesh with their offsets 318, 320 in such a manner that the radial arms 322, 324, 326 and 328 are disposed essentially in one plane. Intermediary members 282 and 284 may be provided on their adjacent sides in the area of the offsets 318, 320 with transverse recesses 330, 332, so as to reduce the axial dimensions of the shaft coupling. The projections 310, 312 or 314, 316 extend in the longitudinal direction of the intermediary members 282, 284 and into recesses 330, 332.

In the embodiment of FIGS. 7 and 8, pretensioned elastic tensioning members 334, 336 are provided between intermediary members 282 and 284, which are only shown schematically in FIG. 8, so that the intermediary members 282 and 284 are held in positive engagement with ball bearing 306.

A modified embodiment is shown in FIGS. 9 and 10. The structure of the embodiment in accordance with FIGS. 9 and 10 is similar to the one of FIGS. 7 and 8. As can be seen from FIG. 9, a surface 338 of each intermediary member, for example, 282, is disposed on both sides of recess 330 in the equatorial plane of ball bearing 306. Retaining members 340, 342 are mounted in a flush position with the projections 310, 312 (see FIG. 7) by means of screws 344, 346. These retaining members 340, 342 extend across ball bearing 306 and engage ball bearing 306 with engagement faces 348, 350. In a similar manner as described for intermediary member 282 of FIG. 9, intermediary member 284 (FIGS. 9 and 10) encompass the left half of ball bearing 306 (FIG. 9) with retaining members (not shown). In the sectional view of FIG. 10, only the projections 314 and 316, as well as the sectionally shown screws 352, 354 for mounting the latter retaining members are shown. In this manner, both intermediary members are positively locked with the ball bearing 306 by the mounting and engagement faces 302, 304 or 348, 350, respectively.

FIG. 11 shows another embodiment of a universal joint 360 which is provided between the intermediary members 356, 358. In the embodiment according to FIG. 11, intermediary members 356, 358 comprise longitudinally straight elements. One of the intermediary members—namely, intermediary member 356, is provided in its center with a spherical shoulder 362. The other intermediary member is provided in its center with a cylindrical aperture 364 into which the shoulder 362 of intermediary member 356 is inserted. Bearing parts 366, 368 with spherical bearing faces are mounted in aperture 364 on both sides of shoulder 362 and are secured by distance spacer rings 370, 372 and snap rings 374, 376, so that the shoulder 362 is positively retained in aperture 364.

In this embodiment, intermediary member 358 consists of a ring 378 forming the aperture 364 and radial arms which extend on both sides from this ring supporting the bearing pins 380, for example. In this embodiment, bearing pins 382, 384 and 386, 388 should not be made of one unitary member with the intermediary member 356, since the intermediary member 356 cannot be inserted through the aperture 364. In addition, intermediary member 356 is provided with transverse bores at its ends through which a continuous pin is inserted shaped by the bearing pins 382, 384 or 386, 388, respectively. On these bearing pins 384, 382 which must be cylindrical pins for insertion purposes, the parts of the joints will be mounted, as will be described later.

In this embodiment, two intermediary members 356 and 358 which are in a perpendicular position, when in their rest position, are coupled with each other by a universally movable joint in the center thereof and thereby centered with respect to each other.

Figure 12:
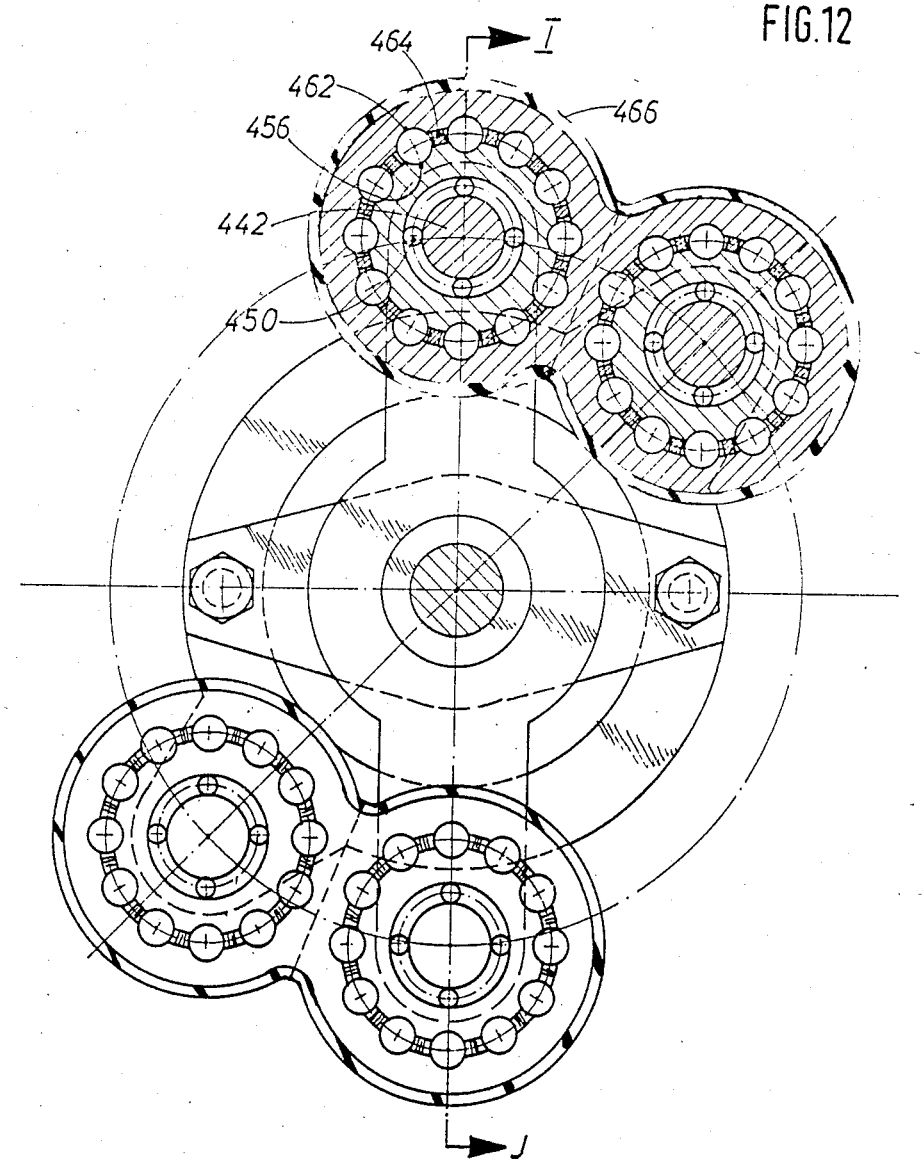
FIG. 12 is a sectional view taken along line K-L of FIG. 13, showing a further embodiment wherein a single intermediary member is centered between the two coupling halves.
Figure 13:
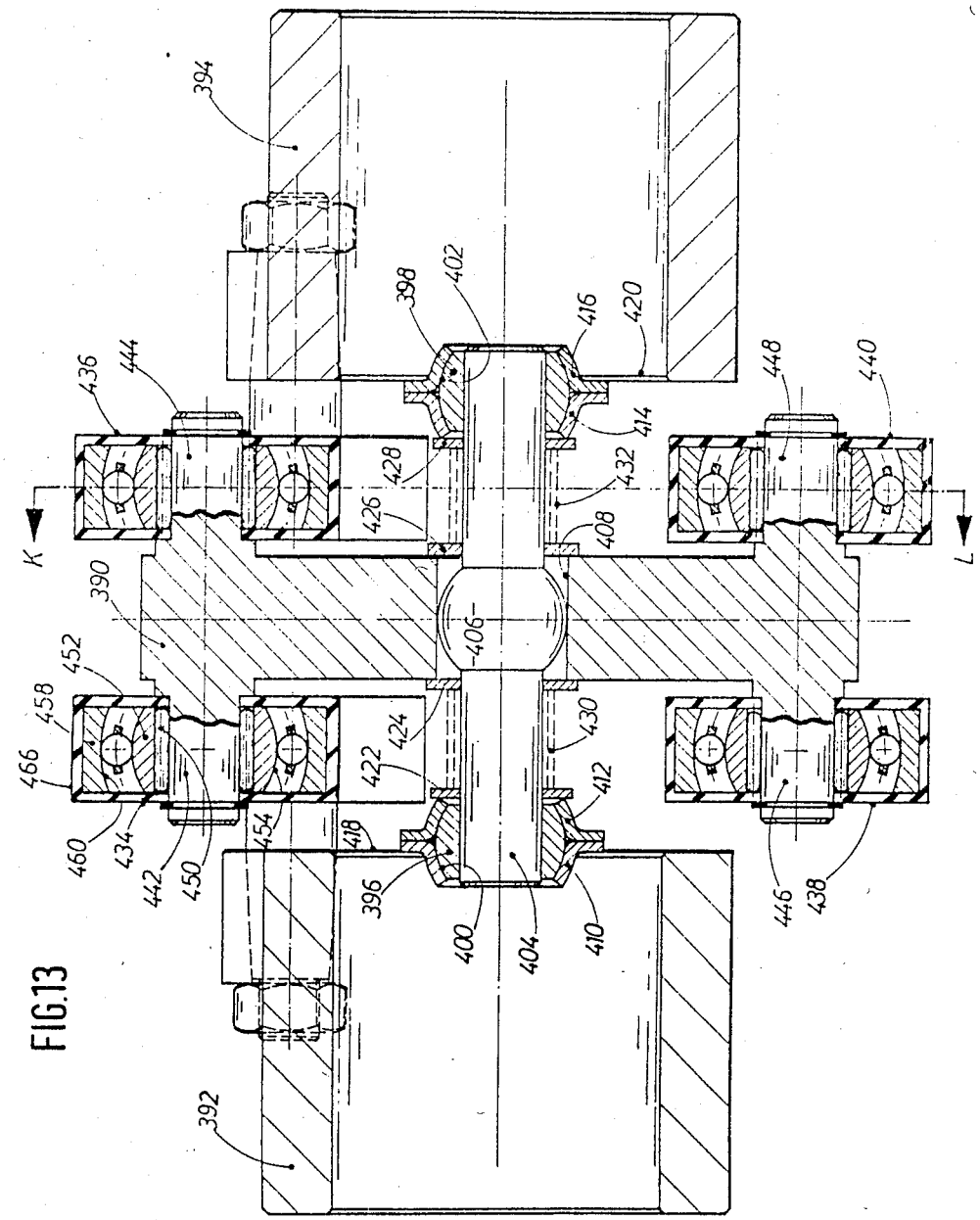
FIG. 13 is a longitudinal sectional view taken along line I-J of FIG. 12.

An embodiment with only a single intermediary member 390 between the coupling halves 392 and 394 is shown in FIGS. 12 and 13. A bushing 396, 398 with a spherical outer face which faces a spherical bearing face 400, 402 and a cylindrical bearing bore is provided on each of two coupling halves for centering the individual intermediary member 390. A pin 404 is rotatably and axially movably mounted in the cylindrical bearing bores of the two bushings 396 and 398 which supports a spherical shoulder 406 in the center thereof. Single intermediary member 390 is mounted on this shoulder by means of its axial bore 408.

Spherical faces 400, 402 are formed by two bearing half-shells 410, 412 and 414, 416, respectively, which surround bushings 396, 398. These bearing half-shells are centrally mounted relative to coupling halves 392, 394 and act as hubs by means of ribs 418, 420.

Pairs of ring-shaped disks 422, 424 and 426, 428 are guided on opposite ends of bearing pin 404. One ring-shaped disk 422, 428 of each pair engages on one part of the adjacent coupling half 392, 394—namely, the bearing half-shell 412, 414 and the other ring-shaped disk 424, 426 on each pair abuts intermediary member 390 adjacent to axial bore 408. Compression springs 430, 432 are mounted on the ends of pin 404 between ring-shaped disks 422, 424 and 426, 428, respectively.

During a radial displacement of the two shafts, for example, when coupling half 394 moves downwardly with respect to coupling half 392, as viewed relative to FIG. 13, ball bearing 406 moves by about half of the shaft displacement. The change caused by the shaft displacement in the distance between the offset center points of the spherical bearing faces 400 and 402 is compensated by the oblique positioning of pin 404 by an axial displacement of the pin ends in bushings 396, 398.

Joints are provided for pivotably mounting guides 434, 436, 438 and 440 on pins 442, 444, 446 and 448, respectively. These joints consist of a roller bearing 450 mounted on pin 442, for example, thus assuring free rotation around the pin axis, an inner ring 452 with a spherical outer face 454 mounted on the roller bearing in which curve-like grooves 456 (FIG. 12) are formed extending in longitudinal direction, an outer ring 458 in guide 434 with a spherical inner face 460 which is opposed in a spaced-apart concentric manner spherical outer face 454 of inner ring 452 and in which curve-like grooves 462 are formed in an aligned arrangement with the grooves 456 of the mentioned outer face 454. Balls are retained between grooves 456, 462 and a cage 464 which permit a pivot movement between guide 434 and pin 442 in a longitudinal plane. As can be seen in FIG. 12, both joints of each guide including the roller bearing 450 and the inner ring 452 are encompassed by a common elastic rubber sheath 466. The elastic rubber sheath which is elastically deformed during a deflection of the joint assures that the angle movements of the guide are evenly distributed to both joints provided on each guide.

However, these guides may also be elastically and pivotably mounted on the pins of the intermediary members by means of rubber cups. In the embodiment of FIGS. 7 and 8, this is carried out in the same manner as already shown in FIG. 2.

Figure 16:
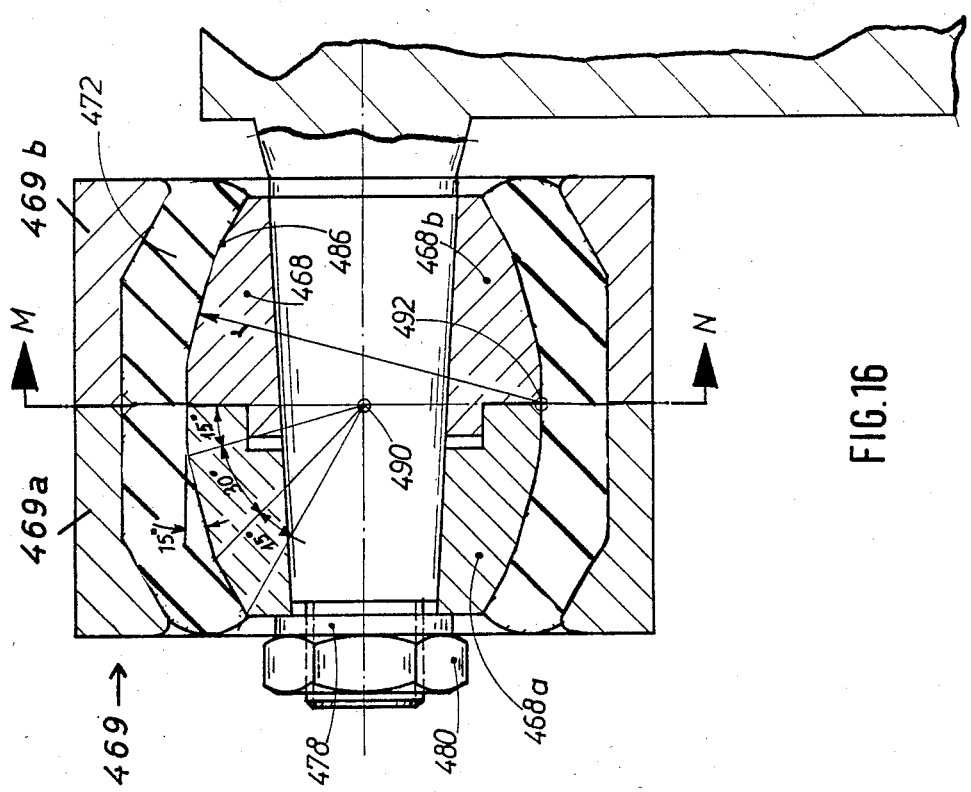
FIG. 16 is a sectional view, in part elevation, of a further embodiment of a rubber cup for pivotably mounting a two-part guide means on the intermediary member.

The "rubber cups" shown therein are known from German laid open patent No. 25 20 947, in particular FIG. 16 or German petty patent No. 71 33 899, but which are not very elastic. The reason for this is that during a deflection of the joint, the elastic rubber mass is pushed against rigid parts of the joint to a great extent and are subjected to compression. One can shape the shoulder like a ball with a center point in the bending point of the joint. This would render the shoulder relatively thick, so that either the dimensions of the total joint will be undesirably large, or the available space for the elastic rubber mass is reduced.

It is therefore another object of the invention to provide an elastic joint (e.g., a rubber cup) which at the same dimensions has a higher degree of elasticity with respect to the mentioned known joints. In particular, a suitable elastic joint for the embodiment of FIG. 11 should be provided.

The joint is provided with a shoulder 468 (FIG. 14) which is mounted on pin 382, for example, of intermediary member 356 as a separate construction member. An eyelet 470 of the guide surrounds shoulder 468 spaced therefrom to define an intermediary space which is filled with an elastic rubber mass 472. The outer face of shoulder 468 is curved in its longitudinal direction with a curvature formed from around a center point, for example, 476 disposed away from axis 474 of pin 382.

Figure 15:
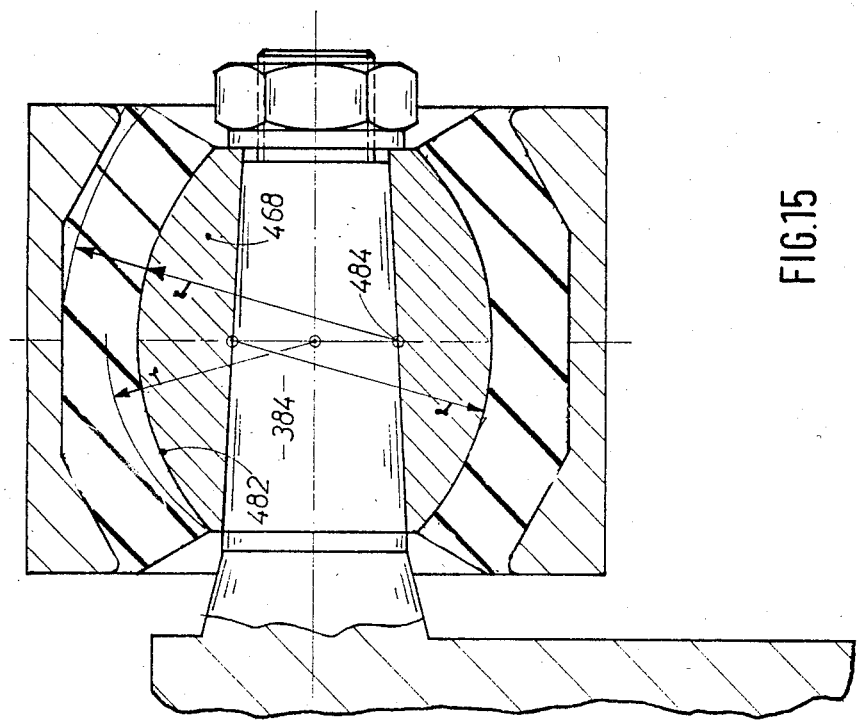
FIG. 15 is a sectional view, in part elevation, of a modified embodiment of the rubber cup.
Figure 14:
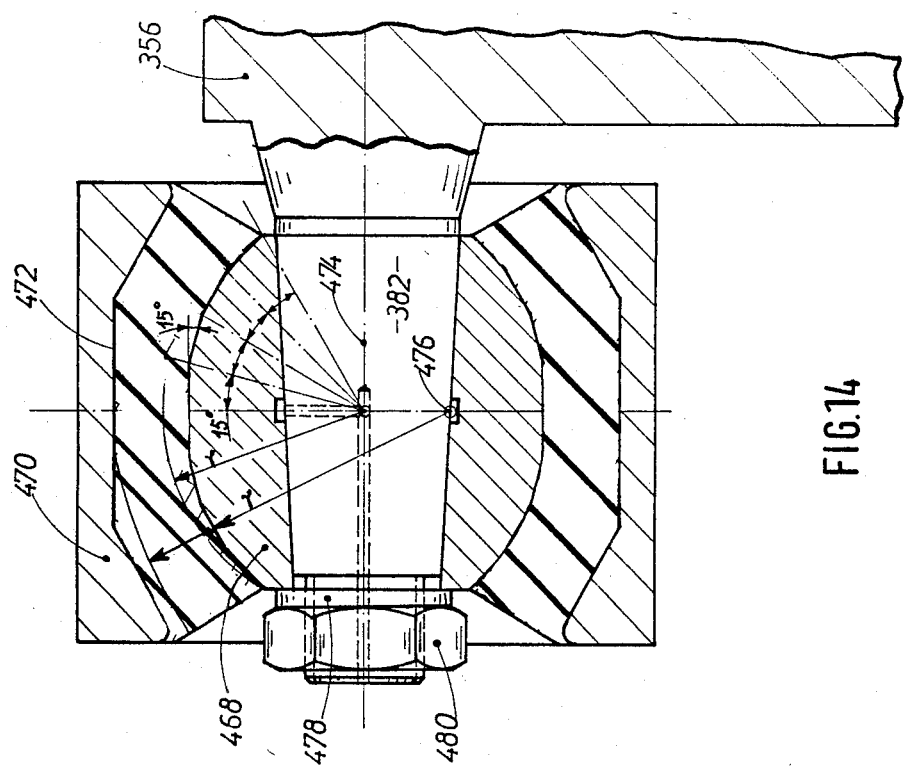
FIG. 14 is a sectional view of one embodiment of a rubber cup for pivotably mounting a guide means on the intermediary member which is particularly suitable for the embodiment shown in FIG. 11.
Figure 17:
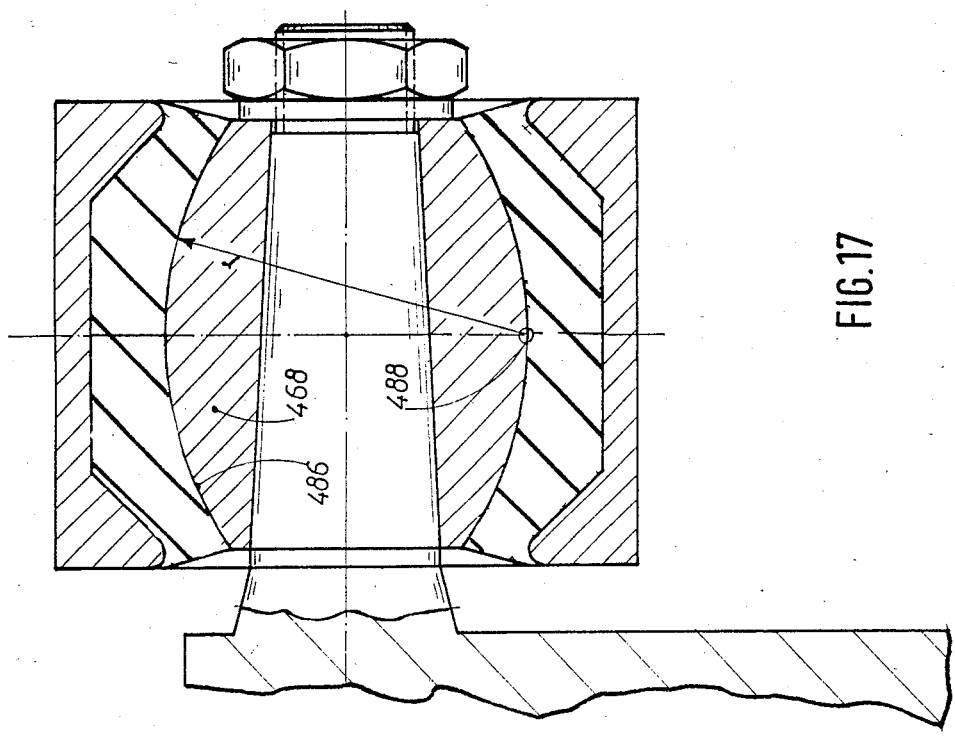
FIG. 17 is a sectional view, in part elevation, of a further modified embodiment of a rubber cup.

In accordance with the embodiment of FIG. 14, as well as the embodiments of FIGS. 15 to 17, pin 382, 384 is somewhat conically shaped, and shoulder 468 is provided with a corresponding conically shaped aperture to allow for shoulder to be mounted on pins 382, 384. Shoulder 468 is secured by means of an annular disk 478 and a nut 480 screwed onto the end of pin 382. This basic structure is the same in the embodiments of FIGS. 14 to 17. In all of the different embodiments, the inner face of eyelet 470 is preferably curved in each longitudinal plane around a point disposed away from the axis of pin 382.

In the embodiment in accordance with FIG. 15, the outer face 482 of shoulder 468 is curved around a point which lies about the jacket face of pin 384. The outer face 482 is also a curved segment formed around this point 484. In the embodiment of FIG. 17 the outer face 486 of shoulder 468 is curved around a point 488 disposed on the opposite side of the outer face 486. Here too, the outer face 486 is a circular segment which is formed around point 488.

The curvature of the outer face of the shoulder may be the result of a series of consecutive conical ring faces with different taper angles. Such embodiments are shown in FIGS. 14 and 16, whereby the resulting "center of curvature" in the case of the embodiment of FIG. 14 corresponds to the embodiment of FIG. 15 and in the case of the embodiment of FIG. 16 to the embodiment of FIG. 17. In the embodiment in accordance with FIG. 14, the generated outer face of shoulder 468 is a polygon whose sides correspond to a center point angle (relative to a center point on the axis 474 of pin 382) corresponding to 15°, whereby adjacent sides of the polygon also encompass an angle of 15°.

In this case, the resulting center of curvature center 476 is disposed on the opposite jacket face of pin 382. During a rotary movement around the center point which is disposed on axis 474, the elastic rubber material is essentially stressed in the circumferential direction despite the flat shape of the elastic joint, and is not pushed against rigid faces of eyelet 470, as is the case in the aforementioned known devices.

In the embodiment of FIG. 16, the generated outer face 486 of shoulder 468 is also a polygon. The sides of this polygon correspond symmetrically relative to the center plane of the center point angle by the center point 490 by about 15°, 30° and again 15°. This results in a median center of curvature 492 which is also disposed on the opposite side of outer face 486, similar to the one of FIG. 17.

Figure 18:
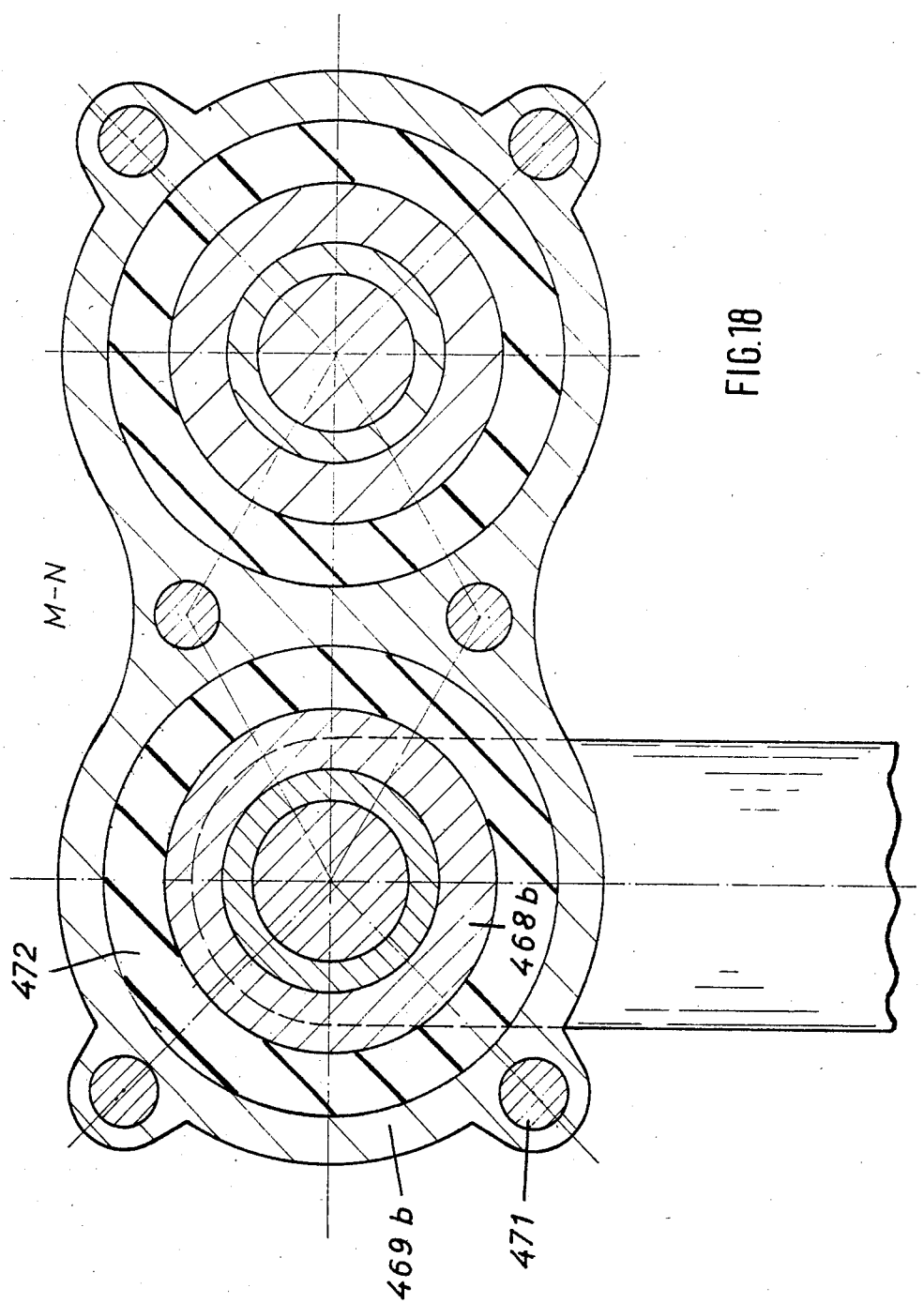
FIG. 18 is a sectional view taken along line M-N of FIG. 16.

In the embodiment of FIG. 16, shoulder 468 consists of two halves 468a and 468b, whereby half 468a is displaceable against half 468b as shown in FIG. 16 by means of an annular disk 478 and a nut 480. The guide 469 shown in FIG. 16 also consists of two halves 469a and 469b, whereby the elastic rubber mass 472 in both halves 469a and 469b of guide 469 with the associated shoulder halves 468a, 468b is vulcanized in such a manner that during a pulling together of the guide halves 469a, 469b by the screws 471 a pretension is generated in the elastic rubber mass 472. A total of six screws 471 are provided, as shown in FIG. 18.

Figure 19:
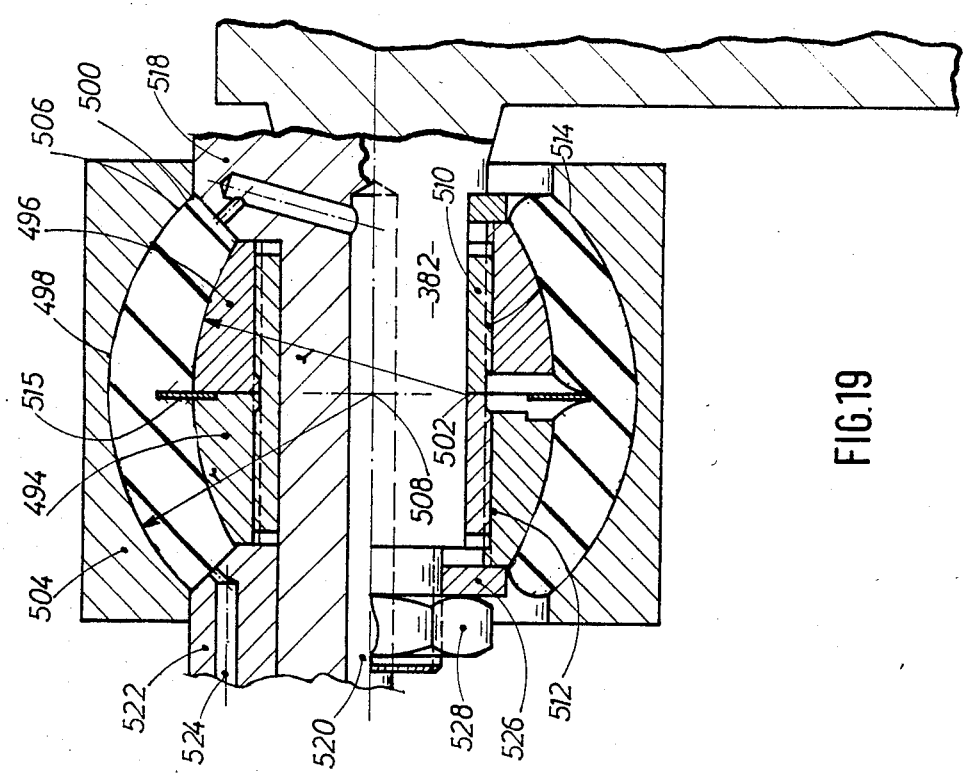
FIG. 19 is a sectional view, in part elevation, of a further embodiment of a rubber cup, with a pretensionable rubber elastic mass.

In the embodiment of FIG. 19, the shoulder consists of two axially adjacent parts 494 and 496. Means for an axial moving apart of these two parts 494, 496 are provided for the purpose of pretensioning the elastic rubber mass 498. The two parts 494, 496 form in their base position a shoulder with an outer face 500 the generated curvature of which is formed by using a point 502 disposed on the jacket face of pin 382 as the center of curvature. The shoulder is encompassed by an eyelet 504 of the guide which has a spherical inner face 506 spaced therefrom. This face 506 is curved around a center point 508 on the axis of pin 382.

As means for moving apart the two parts, a jacket 510 is rotatably mounted on which has on its exterior face a right thread 512 on one half and a left thread 514 on the other half. The two parts 494, 496 of the shoulder are provided with corresponding threads and are screwed onto threads 512, 514, respectively. In the base position, an annular disk 515 is inserted into the elastic rubber mass 498 and extends from the inside of the mass between the parts 494 and 496.

Jacket 510, shoulders 494, 496 and the eyelet 504 in the base position, with the elastic rubber mass 498 is cast, as indicated in the upper part of FIG. 19. Jacket 510 is mounted on a gravel molding core 518 which contains a conduit 520 for the elastic rubber mass. Eyelet 504 is mounted on gravel mold core 518 and on a jacket-like limiting member 522 which also has a conduit 524 for receiving the elastic rubber mass. In this manner, a closed annular space is provided between eyelet 504 and shoulder 494, 496 into which annular disk 514 extends. The elastic rubber mass is then forced into this annular space through conduits 520 and 524 and vulcanized therein. Thereafter, limit member 522 is removed and the structure consisting of jacket 510, shoulders 494, 496, elastic rubber mass 498 and eyelet 504 are removed from mold core 518. This unit is then placed on pin 382 and secured by annular disk 526 and nut 528. If a pretension is desired for elastic rubber mass 498, bushing 510 is first turned. Thereby, the two parts 494, 496 of the shoulder are screwed apart as shown in the lower part of FIG. 13, and elastic rubber mass 498 is pretensioned against inner face 506.

The purpose of annular disk 514 is to assure defined conditions in the area of the separating joint between the parts 494 and 496, so as to prevent a tearing of the rubber mass during the pulling apart of parts 494 and 496.

Figure 20:
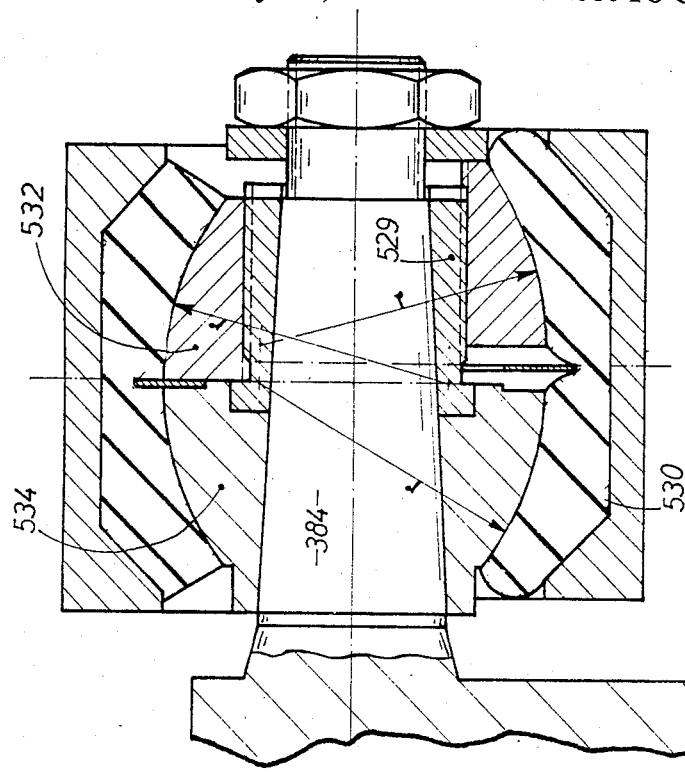
FIG. 20 is a sectional view, in part elevation, of a different embodiment of a rubber cup with a pretensionable rubber elastic mass.

In the embodiment in accordance with FIG. 20, which in many points is constructed in a similar manner to the embodiment of FIG. 19, a bushing 529 with an outer thread is rotatably mounted on pin 384 for pulling apart shoulder parts 532, 534. One of the parts 532 of the shoulder is mounted with an inner thread on this bushing. By turning the bushing, one part is then axially moved with respect to the other part, which also accomplishes a pretensioning of the elastic rubber mass 530.

As can be seen from the figures, the inner face may be defined as a circle in the same manner as the inner face 506. The generated inner face may also be a polygon as shown in FIGS. 8 to 11 and 14, for example. The inner face may be shaped by a central cylinder face and adjacent tapered faces, as seen in FIG. 20.

Figure 21:
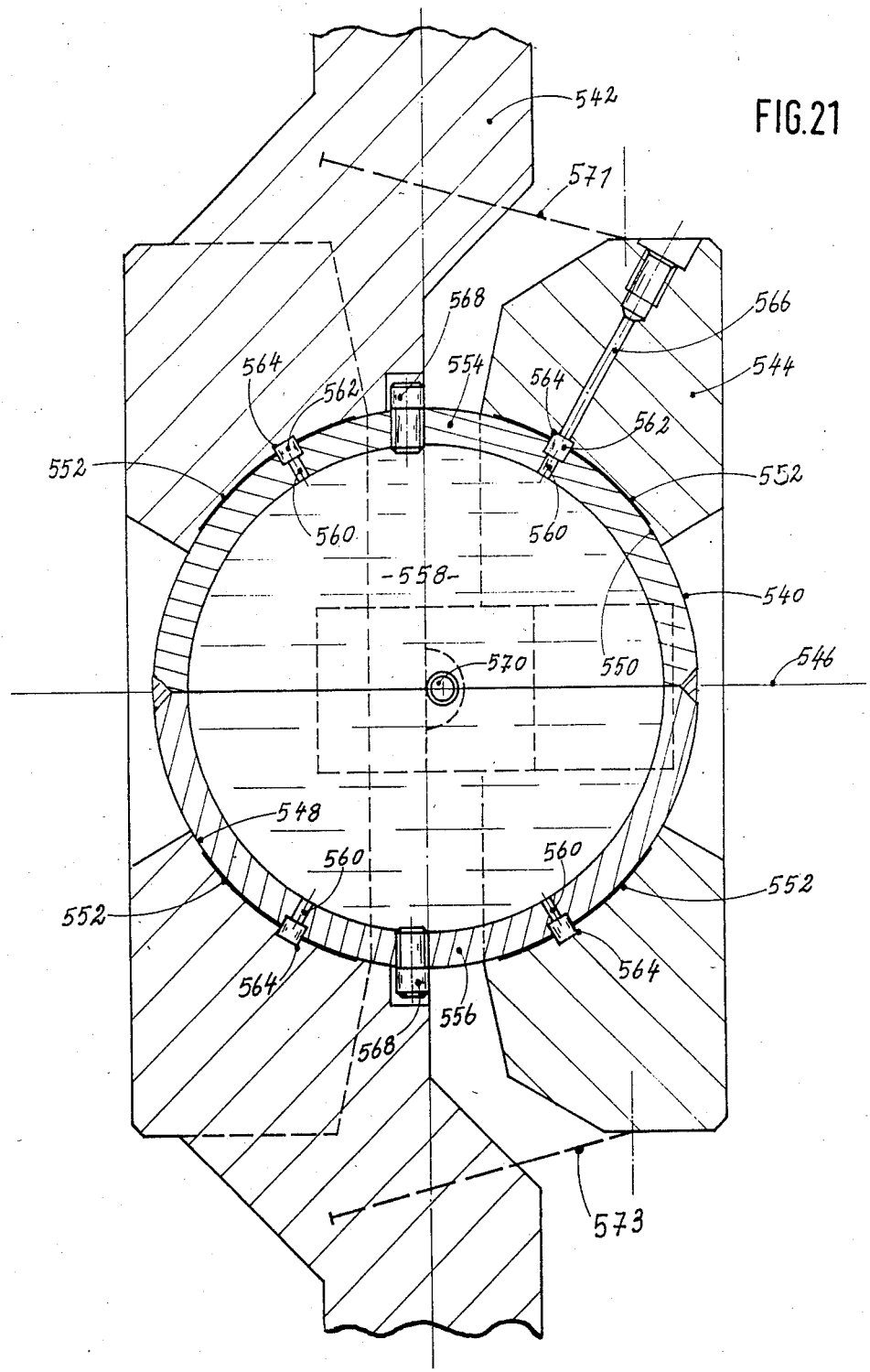
FIG. 21 is an enlarged sectional view of a further embodiment wherein two crossing intermediary members are retained in a central position without interfering with their compensating movements by a ball bearing retained therebetween which is provided with a friction reducing agent.

FIG. 21 illustrates a ball bearing 540 which is retained between two crossing intermediary members 542, 544 in a shaft coupling of the type shown in FIG. 1 to 4 of the German patent application P No. 30 16 267.5, dated Apr. 24, 1980. Each of the intermediary members 542 and 544 is coupled with the two coupling halves by means of guides of the aforementioned described type (not shown).

The intermediary members 542 and 544 are displaced by an angle of 90° with respect to each other around an axis of rotation 546. For effecting a rotational movement and so that they are centered on the one hand and may carry out their compensating movements independent from each other, intermediary members 542 and 544 are provided with opposite facing aligned recesses 548, 550 in their crossing zone between which ball bearing 540 is retained.

Ball bearing 540 is provided with friction reducing agents. Although the ball bearing 540 is not used for the transmission of the torque in the subject embodiment, radial forces may be acting on the ball bearing, for example, centrifugal forces. In addition, intermediary members 542 and 544 perform compensating movements toward each other and toward the ball bearing 540 when a radial displacement is present. The friction reducing agents should prevent wear and tear on the ball bearing during the compensating movements and the simultaneous action of the radial force. The friction reducing agents have a friction reducing coating 552 on the surface of recesses 548, 550. This coating 552 may be formed by a self-lubricating bearing material.

A further feature of the friction reducing means is that ball bearing 540 is shaped as a hollow ball and is filled with a lubricating agent, preferably grease. For this purpose, ball bearing 540 is made of two semispherical shells 554 and 556 which are welded together. The inner chamber 558 of ball bearing 540 is connected by means of radial conduits 560 with the outer surface which are retained between recesses 548, 550.

Annular grooves or channels 562 are formed on the surface of ball bearing 540 which are connected to inner chamber 558 of ball bearing 540 by means of radial conduits 560. Annular grooves 564 are formed on the surface parts of recesses 548, 550 which engage the ball bearing. A lubricating conduit 566 which is provided in the intermediary member 542, 544 discharges into grooves 564. A lubricating agent, for example, a lubricating grease may be introduced from the outside through lubricating agent conduit 566, the annular groove 564, the annular groove 562 and the radial conduits 560 into inner chamber 558 of ball bearing ball 540.

It should be noted that even when turning intermediary members 542, 544 with respect to ball bearing 540, annular grooves 562 and 564 always overlap at two points so that a continuous path for the lubricating grease is always open, even if the annular grooves are not exactly aligned, as shown in FIG. 21. However, it must always be made sure that annular grooves 562 are covered by intermediary members 542 and 544, so that the lubricating grease is not expelled outwardly due to the centrifugal forces. In order to assure this, the rotating movement of the ball bearing 540 relative to the intermediary members 542, 544 is limited by abutments 568, 570.

Recesses 548, 550 may be somewhat flatter with respect to the cross section of ball bearing 540. Thereby, the rubber joints are so pretensioned on the guides that intermediary members 542, 544 are pushed yieldingly against ball bearings 540 and remain in engagement therewith even after wear and tear of the ball bearing 540. Elastic tensioning members 571, 573 may be provided between intermediary members 571, 573.

Figure 22:
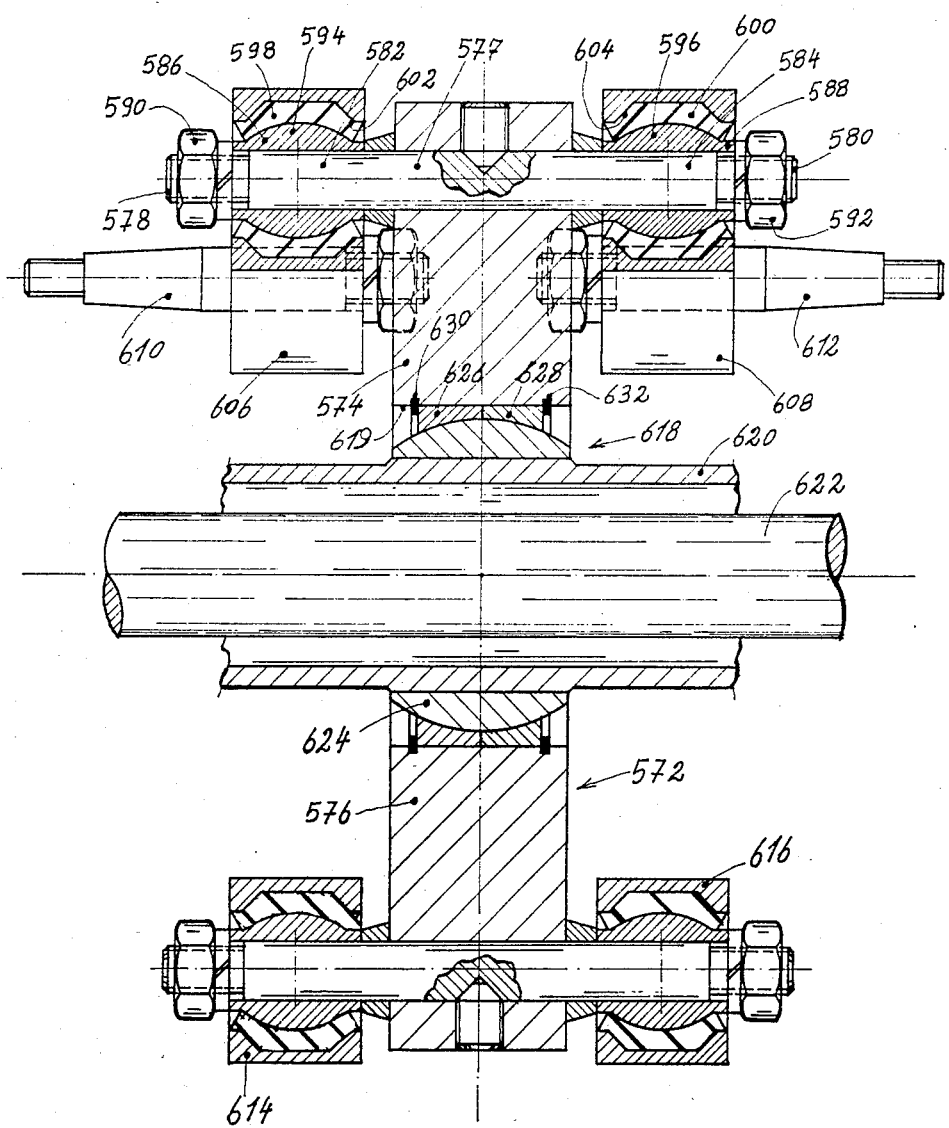
FIG. 22 is a sectional view, in part elevation, of another embodiment of a shaft coupling with a bearing member which is retained in a central position by a pipe, so that a continuous shaft may be inserted centrally through the bore of the pipe and thereby through the shaft coupling.

FIG. 22 illustrates a shaft coupling which in its basic concept corresponds to the embodiments of FIGS. 5 and 6. Only one single intermediary member 572 is shown having two arms 574 and 576. Arm 574 supports a continuous axial pin 577 which at its ends is provided with threads 578, 580. The ends 582 and 584 of pin 577 which extend from arm 574 are encompassed by bushings 586, 588 which are screwed by nuts 590, 592 onto threads 578, 580 and are mounted against the front faces of arm 574. Bushings 586 and 588 are provided with shoulders 594, 596. Shoulders 594 and 596 are each surrounded by a rubber cup 598, 600 mounted in a recess 602, 604 of guides 606, 608.

In the rest position, guides 606 and 608 extend parallel with respect to each other and are coupled at their ends in a similar manner with pins 610, 612 which are mounted on the first and second coupling halves (not shown).

Figure 25:
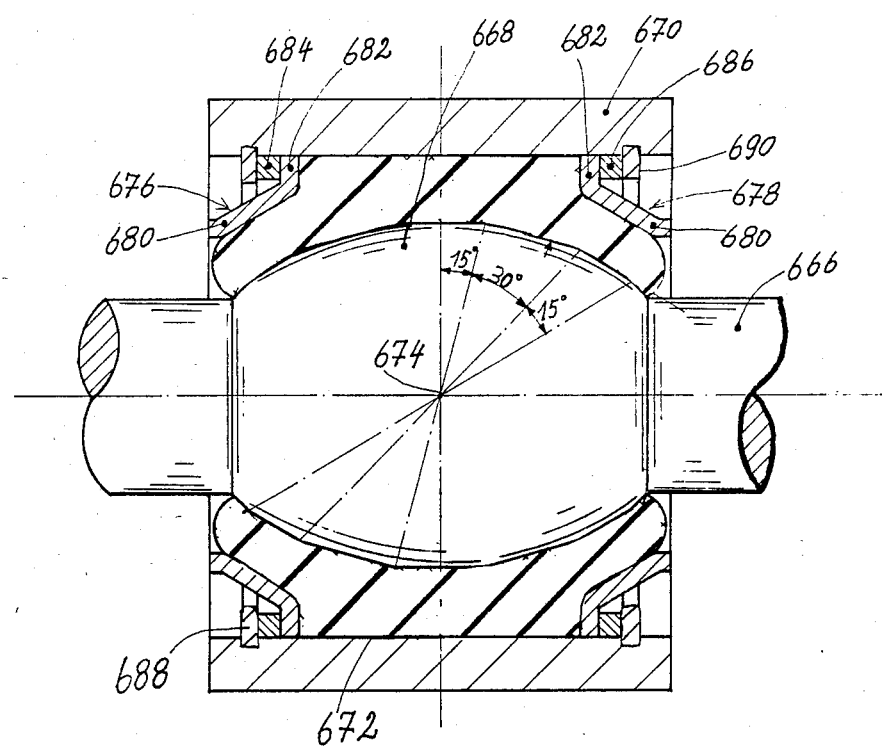
FIG. 25 is an enlarged, longitudinal sectional view of a further embodiment of a rubber cup through which the guide means, for example, of the embodiment shown in FIG. 24, is coupled with the pins of the intermediary member.
Figure 26:
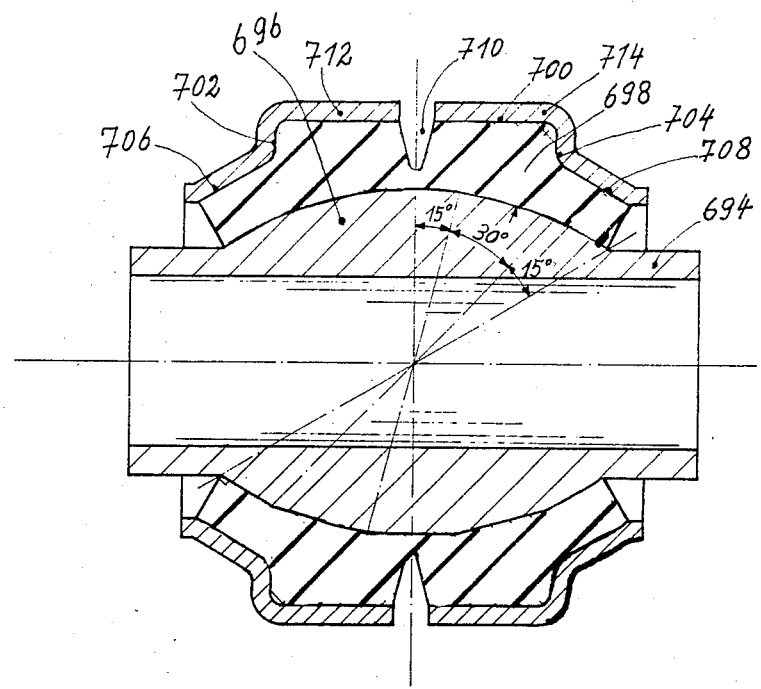
FIG. 26 is an enlarged, longitudinal sectional view showing a different embodiment of the rubber cup.

The structure of the rubber cups is described in detail in conjunction with FIGS. 25 and 26.

In the same manner, arm 576 is coupled by means of guides 614 and 616 which, in the rest position, are antiparallel with respect to guides 606, 608 and are connected with pins to the coupling halves (not shown). Intermediary member 572 is mounted on a pipe 620 by means of a ball joint 618 for centering intermediary member 572, in particular, against centrifugal forces during rotation without transmission of torque. Pipe 620 is coupled at both of its ends by means of universally movable joints with the first and second coupling halves (not shown). For example, the joint couplings may be shaped like the one shown in FIG. 7 of German patent application P No. 30 16 267.5 dated Apr. 26, 1980. A continuous shaft 622 is centrally inserted through the pipe.

Ball joint 618 is constructed as follows: Intermediary member 562 is provided with a central axial bore 619. A ring 624 with a spherical outer face is mounted on pipe 620. Two rings 626 and 628 with concave-spherical inner faces are inserted from opposite sides into bore 619. The concave spherical inner faces of rings 626 and 628 complement each other to form a spherical support face which is complementary to the outer face of ring 624, to tightly encompass the ring. Rings 626 and 628 are secured in an axial direction by snap rings 630, 632. They are made of a self-lubricating material.

Figure 23:
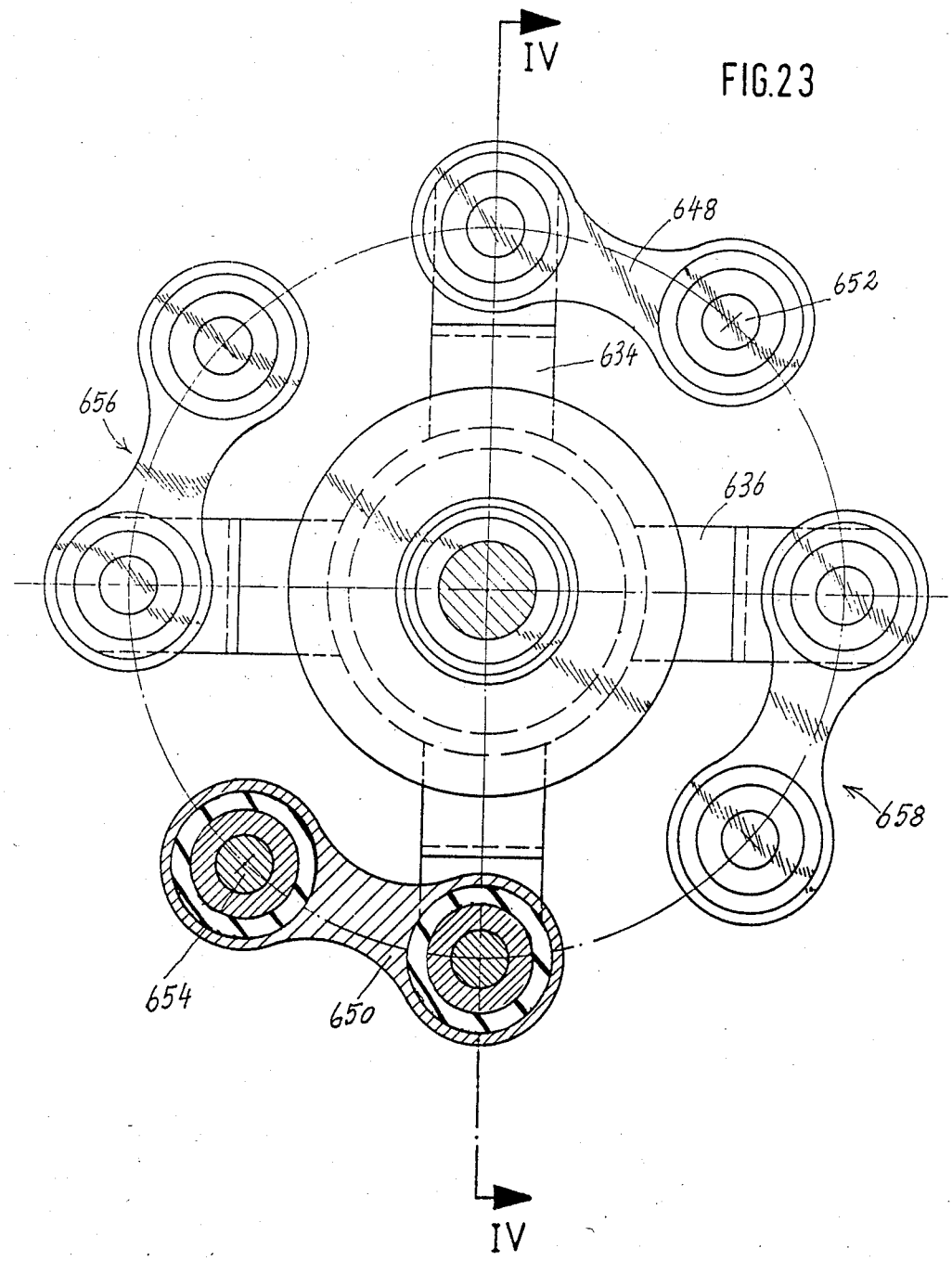
FIG. 23 is a sectional view, in part elevation, taken along line III—III of FIG. 24, showing a shaft coupling with two adjacent centered intermediary members which permit the passage of a continuous shaft.
Figure 24:
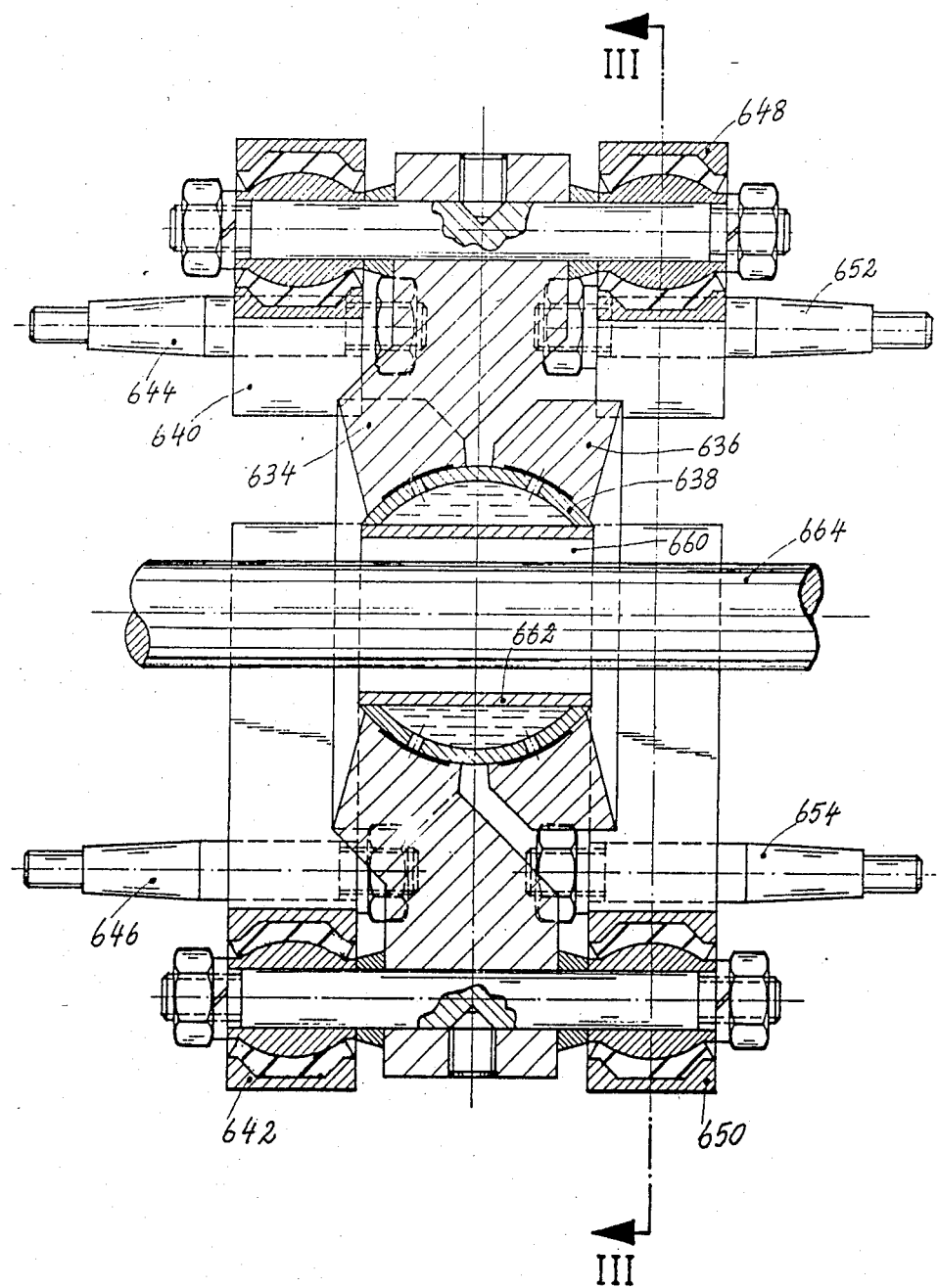
FIG. 24 is a longitudinal sectional view taken along line IV—IV of FIG. 23.

FIGS. 23 and 24 show a shaft coupling with two intermediary members 634 and 636 which cross over each other and are centered by a ball bearing 638. Intermediary member 634 is coupled by a means of diametrically-opposite universal guide 640, 642, which are antiparallel with respect to each other in the rest position, and pins 644, 646 to the first coupling half (not shown) and by means of a second pair of guides 648, 650 which are in axially-aligned position in the rest position with guides 640, 642 and pins 652, 654 to the second coupling half. In a similar manner, the intermediary member 636 is coupled with the one pair of guides by means of two pairs of guide 656, 658 which are aligned in the axial direction with respect to each other on the one hand with the first coupling half and on the other hand with the second coupling half.

The design of each individual intermediary member 634, 636 and the design of the guides corresponds essentially to the embodiment of FIG. 22 and is therefore not again described in detail.

The design of the ball bearing 638 and the provided friction reducing means is similar to the embodiment of FIG. 21. Such a ball bearing of FIG. 1 could also be used in conjunction with intermediary members 634 and 636 of FIG. 24. In the embodiment in accordance with FIGS. 23 and 24, ball bearing 638 is provided with a central bore 660 defined by a welded pipe 662. A continuous shaft 664 is inserted through central bore 660.

FIG. 25 shows one embodiment of a rubber cup with which the guides are pivotably mounted on pins of the intermediary member, for example, 562, as can be seen in FIG. 22. As shown in FIG. 25 the rubber cup is mounted on a shoulder 668 of pin 666. An eyelet 670 of the guide surrounds shoulder 668 spaced therefrom, and an elastic rubber mass 672 fills the intermediary space between shoulder 668 and eyelet 670. The design of shoulder 668 corresponds to FIG. 10 of German patent application P No. 30 16 267.5, that is, the generation surface of the outer face of shoulder 668 is a polygon. The sides of this polygon correspond to the one shown in FIG. 25, i.e., it is symmetrically-disposed relative to the plane of the center point 674 with center point angles around the center point 674 being 15°, 30° and again 15°. Thereby, a median center of curvature point is obtained which is disposed on the opposite side of the outer face of shoulder 668. This is advantageous in that the elastic rubber material is substantially stressed in the circumferential direction and not pushed against the rigid faces of eyelet 670 by annular-like compression members 676, 678, during a rotating movement of the elastic joint around the center point 674, despite the small structure of the elastic joint.

In the embodiment in accordance with FIG. 25, the elastic rubber mass is pretensioned on both sides around pin 666 by means of compression members 676, 678 which are pressed inwardly in the eyelet 670 thereby pretensioning the rubber mass 672 which is secured in this pretensioned condition. The annular-like compression members 676, 678 are sheet metal parts having an axially tapering inner portion 680 which tapers axially and outwardly and an adjacent radially outwardly extending flange 682. The radially outwardly extending flanges 682 of the compression members 676, 678 engage distance spacer rings 684, 686 which are inserted from opposite sides into eyelet 670. Distance spacer rings 684, 686 are retained in grooves on the inner face of the eyelet into which snap rings 688, 690 engage. Due to the selection of the thickness of the distance spacer rings 684, 686, the degree of the pretension of the elastic rubber mass 672 may be selected in accordance with the required requirements.

FIG. 26 shows another embodiment of a rubber joint. A bushing 694 is mounted on a shoulder 696. Bushing 696 may be mounted on the pin in a manner similar to FIG. 22. The shoulder has the same shape as shoulder 688 of FIG. 25. An elastic rubber mass 698 is mounted on shoulder 696. The jacket face of the rubber elastic mass 698 is provided with a cylindrical center part 700, radial annular shoulders 702, 704 adjacent thereto and adjacent faces 706, 708 which conically taper towards their ends. Elastic rubber mass 698 is provided on the cylindrical center part 700 of its jacket face with a cross-sectional V-shaped circumferential groove 710. Sheet metal parts 712, 714 are placed on the jacket face on both sides of the circumferential groove; the sheet metal parts conforming to the shape of the jacket face. The circumferential groove 710 permits a movement of the elastic rubber mass 698 when the rubber joint is inserted into the eyelet of a guide and retained therein by means of distance spacer rings and snap rings under an axial pretension, in the same fashion as shown in FIG. 25.

I claim:

1. A shaft coupling comprising:
    a first coupling half;
    a second coupling half; and
    means for transmitting constant velocity between said first and second coupling halves, said means including;
    an intermediary member disposed between said first and second coupling halves having a first side facing said first coupling half and a second side facing said second coupling half, said first and second coupling halves and said intermediary member defining an axial direction and a circumferential direction;
    a first rigid guide member and a second rigid guide member interconnecting said first coupling half and said intermediary member at said first side of said intermediary member; and
    a third rigid guide member and a fourth rigid guide member interconnecting said second coupling half and said intermediary member at said second side of said intermediary member;
    in the neutral position of said coupling, said first and third rigid guide members being disposed in a first plane parallel to said axial direction and said second and fourth rigid guide members being disposed in a second plane parallel to said axial direction;
    each said first, second, third, and fourth rigid guide member being articulated to a related one of said first coupling half and said second coupling half and to said intermediary member;
    said second and said fourth rigid guide members being articulated at diametrically opposed locations with respect to said first and said third rigid guide members, respectively, at said intermediary member and at the related one of said first coupling half and said second coupling half; and
    all of said first, second, third, and fourth rigid guide members extending from said intermediary member in said circumferential direction.

2. A shaft coupling according to claim 1, wherein said intermediary member comprises two segments disposed at an offset angle arrangement around an axis of rotation, each intermediary member segment being coupled by means of separate sets of said first, second, third and fourth rigid guide members with said first coupling half and with said second coupling half.

3. The shaft coupling according to claim 2, wherein said intermediary member segments are rotatably coupled for rotation about a central axis of rotation.

4. The shaft coupling according to claim 2, wherein said guide members are universally coupled by means of rubber cups with the associated coupling halves and the associated intermediary member segment.

5. The shaft coupling according to claim 4, wherein each guide member forms a housing in which a rubber cup is disposed and wherein pins are mounted on said associated coupling halves and said associated intermediary member segments which extend into the associated housing of the corresponding guide member for receipt and retention in said rubber cup thereof.

6. The shaft coupling according to claim 4, wherein a housing is provided on said coupling halves and said intermediary member segments in which said rubber cups are retained, wherein a pin is yieldingly retained in each of said rubber cups and extends at both sides axially from said housing, and wherein the extending ends of said pins on said coupling halves and said intermediary member segments are coupled with each other by means of a plate-like guide.

7. The shaft according to claim 6, wherein said ends of said pins each have a pair of opposite planar faces, and wherein said plate-like guides having apertures by which they are supported on said pins, said apertures having straight edges which engage said planar faces.

8. The shaft coupling according to claim 2, wherein said intermediary member segments are coupled with each other by means of a universal joint.

9. The shaft coupling according to claim 8, wherein said intermediary member segments are provided with opposing recesses in a crossing zone thereof for effecting a rotatable coupling therebetween, and wherein a ball bearing is retained between said recesses.

10. The shaft coupling according to claim 9, wherein each of the two crossing intermediary member segments is provided with a pair of 180° angularly offset projection faces which are centered and sector-like with respect to the rotating axis thereof and which extend across an angle of less than 90°, said projection faces of each pair having a spherical recess formed centrally therebetween with respect to the rotating axis, so that spherical mounting faces of sector-like shape are provided theron, and wherein said projection faces of one intermediary member segment engages between the projection faces of the other intermediary member segment with the ball bearing being retained between the spherical mounting faces thereof.

11. The shaft coupling according to claim 10, wherein said intermediary member segments comprise longitudinal-extending radial members having a central offset portion and radial arms extending on both sides of said radial member, and wherein said intermediary member segments cross over one another in the area of their offset portions in such a manner that the radial arms are substantially disposed in one common plane.

12. The shaft coupling according to claim 11, wherein said intermediary member segments are each provided with a transversely-extending recess on the sides facing each other in the area of said offset portions, and wherein said projection faces extend in the longitudinal direction of said intermediary member segments into these recesses.

13. The shaft coupling according to claim 12, wherein pretensioned elastic tensioning members are provided between said intermediary member segments, so that said intermediary member segments are positively held in engagement with said ball bearing.

14. The shaft coupling according to claim 12, wherein a surface of each intermediary member segment disposed at both sides of said recess lies in the same plane as the center line of said ball bearing, and wherein retaining members having spherical engagement faces are mounted on this surface flush with said projection faces, whereby both intermediary member segments are positively coupled with said ball bearing by means of said spherical engagement faces.

15. The shaft coupling according to claim 9, wherein said ball bearing is provided with friction reducing means.

16. The shaft coupling according to claim 15, wherein said friction reducing means comprises a friction reducing coating on the surface of said recesses.

17. The shaft coupling according to claim 15, wherein said ball bearing is a hollow ball filled with a lubricating agent, and wherein the inner space of said ball bearing is connected by means of radial conduits with the outer surface thereof, and the surface of said recesses.

18. The shaft coupling according to claim 15, wherein annular grooves are formed on the outer face of said ball bearing which communicate with the inner space of the ball bearing via radial conduits, and wherein annular grooves are formed on the surface of said recesses which engage said ball bearing, and which communicate with the annular grooves on the outer face of said ball bearing, wherein said intermediary member has a lubricating conduit therein which discharges into said annular grooves of said recesses, and wherein abutments are provided for limiting the rotational movement of said ball bearing with respect to said intermediary member segments.

19. The shaft coupling according to claim 15, wherein said ball bearing is provided with a central aperture, and wherein a continuous shaft extends through said central aperture.

20. The shaft coupling according to claim 8, wherein each intermediary member segment has pins mounted thereon, and wherein said guide members are pivotably mounted in an elastic manner by means of rubber cups on said pins of said intermediary member segment.

21. The shaft coupling according to claim 20, wherein said rubber cups are provided with a shoulder which is mounted on the pin of the intermediary member segment, and wherein an eyelet of said guide surrounds said shoulder spaced therefrom to define an intermediary space between said shoulder and said eyelet, which is filled with an elastic rubber mass, said shoulder having an outer face which is generally curved in each longitudinal plane around a center point of curvature spaced from the axis of said pin.

22. The shaft coupling according to claim 21, wherein said inner face of said eyelet is also generally curved in each longitudinal plane around a center point of curvature spaced from the axis of said pin.

23. The shaft coupling according to claim 21, wherein said outer face of said shoulder is curved in each longitudinal plane at about an center point of curvature disposed on the surface of said pin.

24. The shaft coupling according to claim 21, wherein the outer face of said shoulder is curved in each longitudinal plane at about a center point of curvature spaced from said outer face.

25. The shaft coupling according to claim 21, wherein the curvature of the outer face of said shoulder is the result of a series of consecutive adjacent conical ring faces with different taper angles.

26. The shaft coupling according to claim 21, wherein said shoulder consists of two axially adjacent parts, and wherein means are provided for axially moving apart said two parts for the purpose of pretensioning said elastic rubber mass.

27. The shaft coupling according to claim 26, wherein said means for moving comprises a bushing rotatably mounted on said pin which on its outer side is provided on one half with a right-handed thread and on the other half with a left-handed thread, and wherein said two parts of said shoulder are screwed onto the right- or left-handed threads with corresponding thread sections.

28. The shaft coupling according to claim 26, wherein said means for moving comprises a bushing provided with an outer thread which is rotatably mounted on the pin, and wherein one of said parts is mounted with its inner thread on said bushing.

29. The shaft coupling according to claim 26, wherein the eyelet, the shoulder in the compressed state and the bushing are filled with the elastic rubber mass and mounted on the pin.

30. The shaft coupling according to claim 29, wherein an annular disk is inserted in said elastic rubber mass which extends from the inside mass between said parts of said shoulder and is retained therebetween.

31. The shaft coupling according to claim 8, wherein said intermediary member segments comprise longitudinally-extending straight members, one of which is proviede with a generally spherical shoulder in the center thereof, and the other of which is provided with a generally cylindrical aperture in its center into which said spherical shoulder of said one intermediary member segment is inserted, and wherein bearing members with spherical bearing faces are inserted into said aperture for supporting said spherical shoulders, and which are secured therein by snap rings which are positively retained in said aperture.

32. The shaft coupling according to claim 1, wherein pins are mounted on said associated coupling halves and said intermediary member and joints are provided for pivotably mounting said guides onto said pins comprising a ball and roller bearing mounted on each pin which assures a free rotatability around the pin axis, an inner ring with a spherical outer face mounted on a wall of said roller bearing, wherein curve-like channels are formed in the longitudinal direction on said outer face, an outer ring with a spherical inner face retained in the guide which concentrically surrounds in a spaced apart manner the spherical outer face of said inner ring in which inner face-like channels are provided in the longitudinal direction aligned with the channels of said outer face, and wherein balls are retained between said channels and a cage to permit a pivot movement between the guide and the pin in a longitudinal plane.

33. The shaft coupling according to claim 32, wherein two joints of each guide including the ball and roller bearing and the inner ring are encompassed by a common elastic rubber sheath.

34. The shaft coupling according to claim 1, wherein said intermediary member is mounted on a tube by means of a ball joint, wherein a pipe is coupled at its two ends with the first and the second coupling half, respectively, by means of universal joint couplings, and wherein a continuous shaft extends centrally through said tube.

35. The shaft coupling according to claim 1, wherein said guides are elastically and pivotably mounted by means of rubber cups on the pins of said intermediary member, wherein said rubber cups are provided with a shoulder mounted on said pin of said intermediary member, an eyelet which surrounds said shoulder spaced therefrom and an elastic rubber mass which fills the intermediary space between said shoulder and said eyelet, and wherein said elastic rubber mass is pretensioned by compression members disposed on both sides around the pin, whereby the mass is pushed inwardly in the eyelet and is secured in the pretensioned position.

36. The shaft coupling according to claim 35, wherein said annular-shaped compression members are sheet metal parts having an axially outwardly tapering inner part and an adjacent radially outwardly protruding flange, wherein the radially outwardly extending flanges of said pressure members engage distance spacer rings which are inserted from both sides into the eyelet, and wherein said distance spacer rings are retained by snap rings which engage into grooves provided in the inner face of the eyelet.

37. The shaft coupling according to claim 35, wherein the jacket face of the elastic rubber mass is provided with a cylindrical center part, radial annular shoulders adjacent thereto on both sides thereof and adjacent thereto tapered faces which taper towards the ends, wherein the elastic rubber mass is provided with a V-shaped circumferentially-extending groove in its cross section on the center of said cylindrical center part, and wherein sheet metal parts corresponding to the surface of said jacket face are mounted on jacket face on both sides of said circumferentially-extending groove.

38. A shaft coupling comprising:
a first coupling half;
a second coupling half; and
means for transmitting constant velocity between said first and second coupling halves, said means including;
an intermediary member disposed between said first and second coupling halves including at least first and second relatively movable segments, said intermediary member defining a first side of said intermediary member and a second side of said intermediary member facing said first and second coupling halves, respectively, said first and second coupling halves and said intermediary member defining an axial direction and a circumferential direction;
a first pair of rigid guide members and a second pair of rigid guide members interconnecting said first and second relatively movable segments of said intermediary member, respectively, and said first coupling half at said first side of said intermediary member; and
a third pair of rigid guide members and a fourth pair of rigid guide members interconnecting said first and second relatively movable segments of said intermediary member, respectively, and said second coupling half at said second side of said intermediary member;

each rigid guide member of each pair of rigid guide members being articulated at a diametrically opposite location with respect to the other rigid guide member of the pair at the related one of said first and second segments of said intermediary member and at the related one of said first and second coupling halves, all of said rigid guide members extending from said intermediary member in said circumferential direction, and, in the neutral position of said coupling, a first rigid guide member of said first pair and a first rigid guide member of said third pair being disposed in a first plane, a second rigid guide member of said first pair and a second rigid guide member of said third pair being disposed in a second plane, a first rigid guide member of said second pair and a first rigid guide member of said fourth pair being disposed in a third plane, a second rigid guide member of said second pair and a second rigid guide member of said fourth pair being disposed in a fourth plane, said first, second, third and fourth planes being parallel to said axial direction.

39. The shaft coupling according to claim 36, wherein each coupling half has a hollow bearing housing defining a generally spherical interior bearing face, and wherein a bushing having a spherical outer face and a cylindrical bearing axial bore is mounted in said housing against said spherical bearing faces on both coupling halves, and wherein a pin is rotatably and axially movable mounted in said cylindrical bearing bores of said two bushings, said pin having a spherical shoulder thereof in the center, and said intermediary member having an axial bore in which said shoulder is received.

40. The shaft coupling according to claim 39, wherein a pair of annular disks is received on each end of said pin, which one annular disk of each pair engaging a part of the adjacent coupling half and the other annular disk of each pair engaging said intermediary member in the area of said axial bore, and wherein compression springs are provided between said annular disks of each pair.

41. In a shaft coupling which permits the parts to be connected together to be at an offset angle with respect to one another, of the type including a first coupling half, a second coupling half, an intermediary member disposed between said first and said second coupling halves, a first guide assembly having universally movably pivotable guides which connect said first coupling half with said intermediary member and a second guide assembly having universally movably pivotable guides which connect said second coupling half with said intermediary member, the improvement comprising,
said intermediary member including two members disposed at an offset angle arrangement around an axis of rotation, said members being provided in a crossing zone thereof with means in combination therewith for effecting a flexible rotatable coupling therebetween,
each said intermediary member being coupled by means of a first pair of diametrically opposed rigid guide members with said first coupling half and by means of a second pair of diametrically opposed rigid guide members with said second coupling half, said guide members of said first pair being in axial alignment with said guide members of said second pair, and
said rigid guide members being coupled to said intermediary members and said first and second coupling halves through universal joints.

* * * * *